United States Patent
Abysalh et al.

(10) Patent No.: US 12,553,043 B2
(45) Date of Patent: Feb. 17, 2026

(54) METHODS AND COMPOSITIONS FOR MESSENGER RNA PURIFICATION

(71) Applicant: Translate Bio, Inc., Lexington, MA (US)

(72) Inventors: Jonathan Abysalh, Lexington, MA (US); Jorel E. Vargas, Lexington, MA (US); Frank DeRosa, Lexington, MA (US); Anusha Dias, Lexington, MA (US)

(73) Assignee: TRANSLATE BIO, INC., Waltham, MA (US)

( * ) Notice: Subject to any disclaimer, the term of this patent is extended or adjusted under 35 U.S.C. 154(b) by 1131 days.

(21) Appl. No.: 17/291,797

(22) PCT Filed: Nov. 8, 2019

(86) PCT No.: PCT/US2019/060544
§ 371 (c)(1),
(2) Date: May 6, 2021

(87) PCT Pub. No.: WO2020/097509
PCT Pub. Date: May 14, 2020

(65) Prior Publication Data
US 2021/0388338 A1 Dec. 16, 2021

Related U.S. Application Data

(60) Provisional application No. 62/757,612, filed on Nov. 8, 2018.

(51) Int. Cl.
*C12N 15/10* (2006.01)

(52) U.S. Cl.
CPC ..... *C12N 15/1017* (2013.01); *C12N 15/1006* (2013.01)

(58) Field of Classification Search
CPC .......... C12N 15/1017; C12N 15/1006
See application file for complete search history.

(56) References Cited

U.S. PATENT DOCUMENTS

2015/0376220 A1* 12/2015 DeRosa ............... C07H 21/02
536/25.4

FOREIGN PATENT DOCUMENTS

| WO | WO 2016/098028 A1 | 6/2016 |
| WO | WO 2018/157133 A1 | 8/2018 |
| WO | WO 2019/207060 A1 | 10/2019 |

OTHER PUBLICATIONS

O'Brien et al., BioProcess International, 2012, 10(5), p. 50-57. (Year: 2012).*
Batey et al., RNA, 2007, 13, p. 1384-1389. (Year: 2007).*
Alton, E. et al., "A randomised, double-blind, placebo-controlled trial of repeated nebulisation of non-viral cystic fibrosis transmembrane conductance regulator (CFTR) gene therapy in patients with cystic fibrosis", Efficacy and Mechanism Evaluation, vol. 3, No. 5, (2016).
Firestein, G.S. et al., "Quantitative Molecular Hybridization with Unfractionated, Solubilized Cells Using RNA Probes and Polyacrylamide Gel Electrophoresis", Analytical Biochemistry, vol. 167, No. 2, pp. 381-386 (1987).
Love, J.D. et al., "Screening of lambda Library for Differentially Expressed Genes Using in Vitro Transcripts", Analytical Biochemistry, vol. 150, No. 2, pp. 429-441 (1985).
International Search Report for PCT/US19/60544, 4 pages, (dated Apr. 7, 2020).
Rayner et al., "Totally Pure RNA: Purification Of In Vitro Transcribed RNA Using the SV Total RNA Isolation System", Promega Notes, 2004, 86: 15-17, Retrieved from url: <https://www.promega.com/-/media/files/resources/promega-notes/86/purification-of-in-vitro-transcribed-rna-using-the-sv-total-rna-isolation-system.pdf>.

* cited by examiner

*Primary Examiner* — Jonathan S Lau
(74) *Attorney, Agent, or Firm* — LATHROP GPM LLP; James H. Velema, Esq.

(57) ABSTRACT

The present invention provides, among other things, methods for purifying mRNA, which involves removing impurities from a messenger RNA preparation synthesized by large scale invitro transcription process (IVT), by precipitating the IVT-synthesized mRNA in a buffer comprising a denaturing salt in combination with a reducing agent, followed by capturing the precipitated mRNA and dissolving the captured mRNA into a solution to obtain purified mRNA.

18 Claims, 8 Drawing Sheets

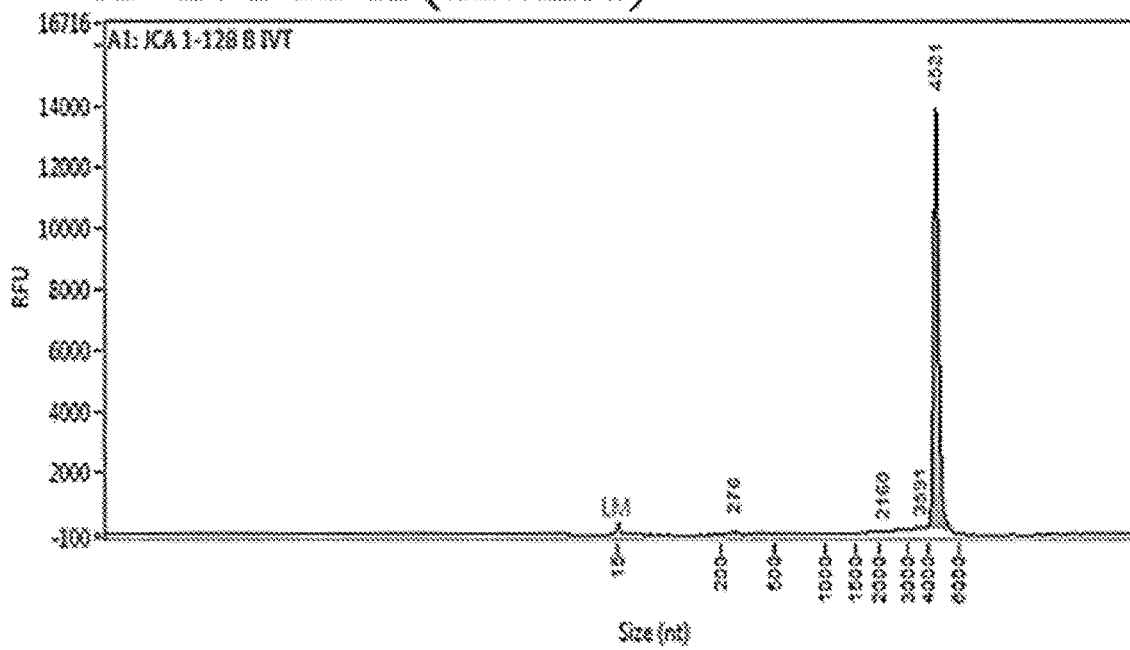
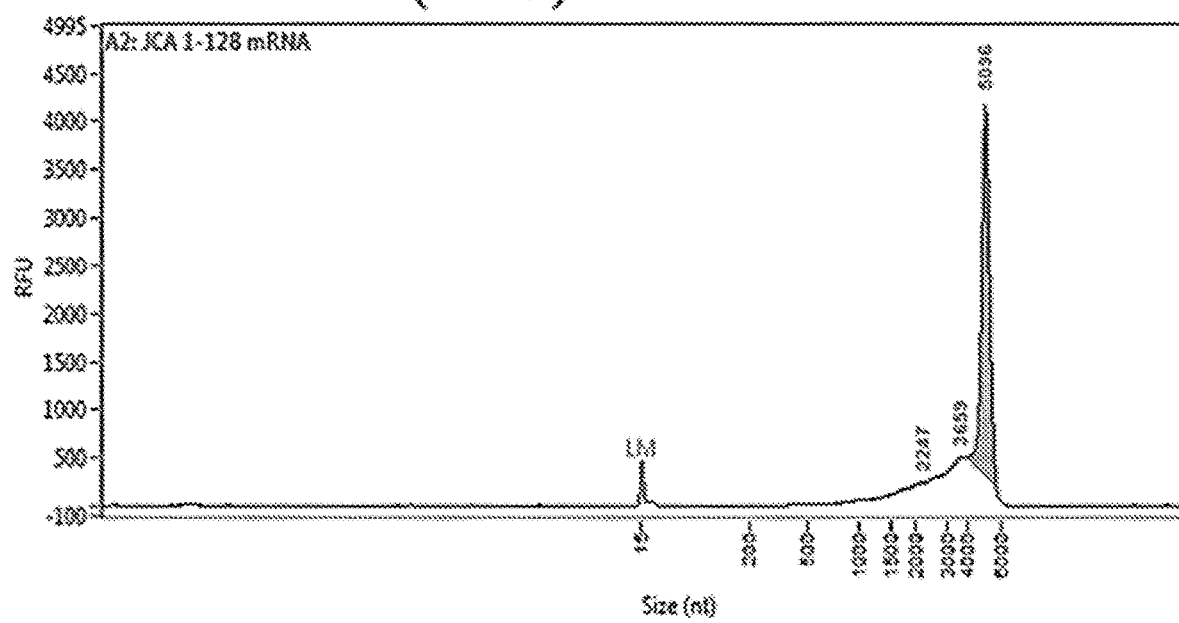
FIG. 5A-B

| Gel Lane | Samples |
|---|---|
| 1 | Faint Positive Assay Control |
| 2 | 5M GSCN Only |
| 3 | 5M GSCN + 10mM DTT |
| 4 | 5M GSCN + 15mM THPP |
| 5 | 5M GSCN + 10mM THPP |
| 6 | 5M GSCN + 5mM THPP |
| 7 | 5M GSCN + 15mM TCEP |
| 8 | 5M GSCN + 10mM TCEP |
| 9 | 5M GSCN + 5mM TCEP |
| 10 | RNase I |
| 11 | SP6 Polymerase Enzyme Control |
| 12 | Guanylyl Transferase Enzyme Control |

METHODS AND COMPOSITIONS FOR MESSENGER RNA PURIFICATION

RELATED APPLICATIONS

This application is a 35 U.S.C. § 371 National Stage Application of International Application No. PCT/US19/60544, filed on Nov. 8, 2019, which claims priority to U.S. Provisional Application Ser. No. 62/757,612, filed Nov. 8, 2018, the disclosures of which are hereby incorporated by reference.

BACKGROUND

Messenger RNA therapy (MRT) is a promising new approach to treat a variety of diseases. MRT involves administration of messenger RNA (mRNA) to a patient in need of the therapy. The administered mRNA produces a protein or peptide encoded by the mRNA within the patient's body. mRNA is typically synthesized using in vitro transcription systems (IVT) which involve enzymatic reactions by RNA polymerases. An IVT synthesis process is usually followed by reaction(s) for the addition of a 5'-cap (capping reaction) and a 3'-poly A tail (polyadenylation). These reactions result in a composition that includes not only the full-length mRNA so formed, but also various undesirable contaminants in the resulting reaction mixture, e.g., proteins, salts, buffers, and non-mRNA nucleic acids that were used or were generated in the reactions. Various purification methods can be employed to remove contaminants to provide purified mRNA. However, trace amounts of residual contaminant proteins or enzymes might result in an unknown adverse effect in a patient. To achieve purified mRNA suitable for administration in a subject, multiple rounds of purification are currently required. Thus, conventional purification methods and compositions are inadequate to provide a clean and homogeneous mRNA that is free of contaminants and is suitable for patient administration without a costly and multi-step purification process.

New and improved methods are necessary to achieve mRNA for therapeutic use that is free of contaminants, in particular, residual proteins or enzymes from the mRNA synthesis process.

SUMMARY OF THE INVENTION

The present invention provides an improved purification method for in vitro synthesized mRNA. The invention is based in part on the surprising discovery that precipitation of mRNA in buffers comprising high concentration of guanidinium salts and a detergent greatly improves the removal of protein contaminants from the mRNA product. Specifically, a single round of precipitation of a capped and tailed mRNA, followed by a purification step can successfully remove detectable levels of residual enzymes from in vitro synthesized mRNA. A reduction in the number of purification steps (such as repeated precipitation steps) results in an easier and more cost-effective manufacturing process. More significantly, the composition and methods described herein result in unexpectedly high mRNA recoveries, purity and integrity. Thus, the present invention permits more efficient and cost-effective manufacturing of mRNA for therapeutic use. Additionally, the methods of the invention are useful in purifying large quantities of mRNA.

In one aspect, the invention provides a method for removing impurities from a messenger RNA (mRNA) preparation synthesized in large scale by in vitro transcription process (IVT), the method comprising: precipitating the IVT-synthesized mRNA in a buffer comprising a denaturing salt in combination with a reducing agent; capturing the precipitated mRNA; and dissolving the captured mRNA into a solution, thereby purifying the mRNA. In some embodiments, the method further comprises the steps of capping and tailing the mRNA before precipitating the mRNA. In some embodiments, impurities in an mRNA preparation obtained by large scale IVT process comprise proteins, including enzymes used for the IVT, capping, and tailing; incomplete RNA transcripts; nucleotides and salt.

In some embodiments, the purified mRNA obtained by the method is greater than at least 90% of the amount of mRNA synthesized.

In some embodiments, the purified mRNA obtained by the method is substantially free of any enzyme impurities.

In some embodiments, at least about 1 mg mRNA is synthesized in the IVT reaction. In some embodiments, at least about 50 mg mRNA is synthesized in the IVT reaction. In some embodiments, at least about 1 gram (g) mRNA is synthesized in the IVT reaction. In some embodiments, at least about 10 g mRNA is synthesized in the IVT reaction. In some embodiments, at least about 100 g mRNA is synthesized in the IVT reaction. In some embodiments, at least about 1 kg mRNA is synthesized in the IVT reaction.

In some embodiments, the buffer for the precipitating step further comprises an alcohol. In some embodiments, the precipitating step is performed under conditions where the mRNA, denaturing buffer and alcohol are present in a volumetric ratio of 1:(5):(3). In some embodiments, the precipitating step is performed under conditions where the mRNA, denaturing buffer and alcohol are present in a volumetric ratio of 1:(3.5):(2.1). In some embodiments, the precipitating step is performed under conditions where the mRNA, denaturing buffer and alcohol are present in a volumetric ratio of 1:(2.8):(1.9). In some embodiments, the precipitating step is performed under conditions where the mRNA, denaturing buffer and alcohol are present in the volumetric ratio of 1:(2.3):(1.7). In some embodiments, the precipitating step is performed under conditions where the mRNA, denaturing buffer and alcohol are present in the volumetric ratio of 1:(2.1):(1.5).

In some embodiments, the denaturing salt is guanidinium thiocyanate. In some embodiments, the denaturing buffer comprises Guanidine thiocynate-Sodium Citrate, N-lauryl sarcosine (GSCN).

In some embodiments, guanidinium thiocyanate is present in a final concentration of 2M or greater, 3M or greater, 4M or greater, 5M or greater, or 6M or greater, 7M or greater. In some embodiments, guanidinium thiocyanate is present in a final concentration of greater than at least 3M. In some embodiments, guanidinium thiocyanate is present in a final concentration of greater than at least 4M. In some embodiments, guanidinium thiocyanate is present in a final concentration of 5M.

In some embodiments, the reducing agent is selected from dithiothreitol (DTT), beta-mercaptoethanol (($\beta$-ME), Tris(2-carboxyethyl)phosphine (TCEP), Tris(3-hydroxypropyl)phosphine (THPP) and dithiobutylamine (DTBA). In some embodiments, the reducing agent is dithiothreitol (DTT).

In some embodiments, DTT is present at a final concentration that is greater than 1 mM and up to about 200 mM. In some embodiments, DTT is present at a final concentration between 2.5 mM and 100 mM. In some embodiments, DTT is present at a final concentration between 5 mM and 50 mM. In some embodiments, the concentration of DTT is 5 mM, 10 mM, 15 mM or 20 mM.

In some embodiments, the step of precipitating the mRNA is performed more than once. In some embodiments, the step of precipitating the mRNA is performed only once.

In some embodiments, the step of capturing the mRNA further comprises subjecting the mRNA to a filtration, a centrifugation, a reversible adsorption to solid phase or a combination thereof.

In some embodiments, the filtration is tangential flow filtration (TFF).

In some embodiments, the filtration is depth filtration (DF).

In some embodiments, the filtration is performed using a Nutsche filter.

In some embodiments, the filtration is performed in combination with centrifugation.

In some embodiments, the step of dissolving the captured mRNA is performed in an aqueous solution.

In some embodiments, the step of captured mRNA is further subjected to dialysis in a suitable buffer comprising lower salt concentration.

In some embodiments, the purified composition is substantially free of any protein impurities is less than 5%, less than 4%, less than 3%, less than 2%, less than 1% protein impurities, or 0% protein impurities.

In some embodiments, the purified mRNA is substantially free of salt.

In some embodiments, the purified mRNA comprises at least greater than 95%, greater than 96%, greater than 97%, greater than 98%, greater than 99%, or about 100% full length mRNA encoding a protein.

The patent and scientific literature referred to herein establishes the knowledge that is available to those with skill in the art. All United States patents and published or unpublished United States patent applications cited herein are incorporated by reference. All published foreign patents and patent applications cited herein are hereby incorporated by reference. All other published references, documents, manuscripts and scientific literature cited herein are hereby incorporated by reference.

Other features and advantages of the invention will be apparent from the Drawings and the following detailed description and claims.

BRIEF DESCRIPTION OF THE DRAWINGS

The above and further features will be more clearly appreciated from the following detailed description when taken in conjunction with the accompanying drawings. The drawings however are for illustration purposes only; not for limitation.

FIG. 5A-B depict capillary electrophoresis of 10 g-scale purified mRNA samples. FIG. 5A, mRNA product without tailing; FIG. 5B, after tailing reaction.

DEFINITIONS

Figure 1:
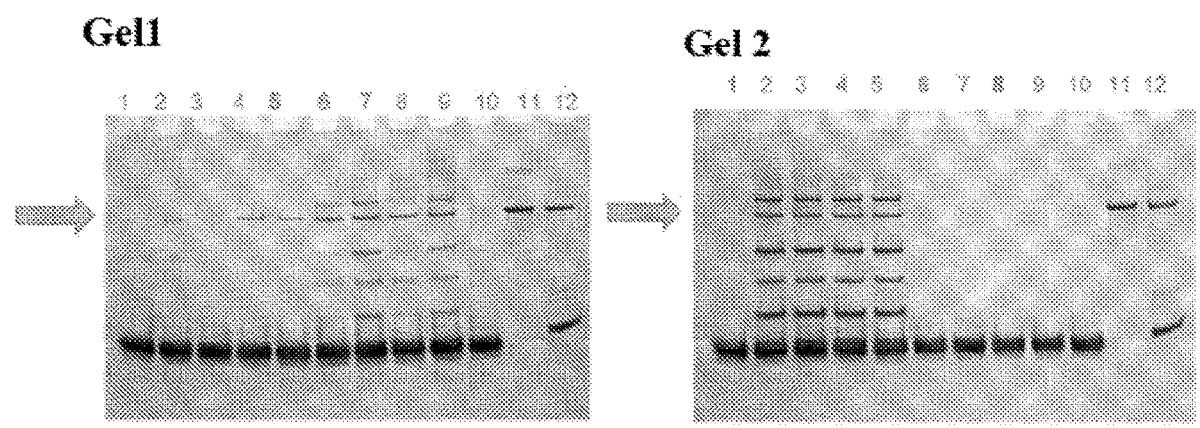
FIG. 1 depicts silver staining gel analysis of purified, RNase 1 digested products for detection of residual protein in mRNA preparation. CFTR mRNA was purified by column filtration. Lane 1 of either Gel 1 (left image) or Gel 2 (right image) represents a positive control mRNA showing faint bands of contaminant proteins. Gel 1, lane 5 depicts the sample from purification using 4M Guanidine thiocynate-Sodium Citrate, N-lauryl sarcosine (GSCN) buffer; Gel 2, lane 6, depicts the sample from purification using 5 M GSCN-1% lauryl sarcosine buffer; Gel 2, lane 8, sample from purification using 5 M GSCN-0.1% lauryl sarcosine buffer. Lanes 10-12 of either gel depict electrophoretic migration controls for RNase 1, SP6 and Guanylate Transferase respectively. Other lanes not identified herein are not applicable (n/a) to the context. Arrows indicate position for migration of a major contaminant band, SP6 polymerase/Guanylate Transferase.

In order for the present invention to be more readily understood, certain terms are first defined below. Additional definitions for the following terms and other terms are set forth throughout the Specification.

As used in this Specification and the appended claims, the singular forms "a," "an" and "the" include plural referents unless the context clearly dictates otherwise.

Unless specifically stated or obvious from context, as used herein, the term "or" is understood to be inclusive and covers both "or" and "and".

The terms "e.g.," and "i.e." as used herein, are used merely by way of example, without limitation intended, and should not be construed as referring only those items explicitly enumerated in the specification.

Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps.

Unless specifically stated or obvious from context, as used herein, the term "about" is understood as within a range of normal tolerance in the art, for example within 2 standard deviations of the mean. "About" can be understood to be within 10%, 9%, 8%, 7%, 6%, 5%, 4%, 3%, 2%, 1%, 0.5%, 0.1%, 0.05%, 0.01%, or 0.001% of the stated value. Unless otherwise clear from the context, all numerical values provided herein are modified by the term "about".

As used herein, the term "batch" refers to a quantity or amount of mRNA synthesized at one time, e.g., produced according to a single manufacturing order during the same cycle of manufacture. A batch may refer to an amount of mRNA synthesized in one reaction that occurs via a single aliquot of enzyme and/or a single aliquot of DNA template for continuous synthesis under one set of conditions. In some embodiments, a batch would include the mRNA produced from a reaction in which not all reagents and/or components are supplemented and/or replenished as the reaction progresses. The term "batch" would not mean mRNA synthesized at different times that are combined to achieve the desired amount.

As used herein, the term "contaminants" refers to substances inside a confined amount of liquid, gas, or solid, which differ from the chemical composition of the target material or compound. Contaminants are also referred to as impurities. Examples of contaminants or impurities include buffers, proteins (e.g., enzymes), nucleic acids, salts, solvents, and/or wash solutions.

As used herein, the term "dispersant" refers to a solid particulate which reduces the likelihood that an mRNA precipitate will form a hydrogel. Examples of dispersants include and are not limited to one or more of ash, clay, diatomaceous earth, filtering agent, glass beads, plastic beads, polymers, polypropylene beads, polystyrene beads, salts (e.g., cellulose salts), sand, and sugars. In embodiments, a dispersant is polymer microspheres (e.g., poly (styrene-co-divinylbenezene) microspheres).

As used herein, "expression" of a nucleic acid sequence refers to one or more of the following events: (1) production of an mRNA template from a DNA sequence (e.g., by transcription); (2) processing of an mRNA transcript (e.g, by splicing, editing, 5' cap formation, and/or 3' end formation); (3) translation of an mRNA into a polypeptide or protein; and/or (4) post-translational modification of a polypeptide or protein. In this application, the terms "expression" and "production," and grammatical equivalent, are used interchangeably.

As used herein, "full-length mRNA" is as characterized when using a specific assay, e.g., gel electrophoresis or detection using UV and UV absorption spectroscopy with separation by capillary electrophoresis. The length of an mRNA molecule that encodes a full-length polypeptide and as obtained following any of the purification methods described herein is at least 50% of the length of a full-length mRNA molecule that is transcribed from the target DNA, e.g., at least 60%, 70%, 80%, 90%, 91%, 92%, 93%, 94%, 95%, 96%, 97%, 98%, 99%, 99.01%, 99.05%, 99.1%, 99.2%, 99.3%, 99.4%, 99.5%, 99.6%, 99.7%, 99.8%, 99.9% of the length of a full-length mRNA molecule that is transcribed from the target DNA and prior to purification according to any method described herein.

As used herein, the term "isolated" refers to a substance and/or entity that has been (1) separated from at least some of the components with which it was associated when initially produced (whether in nature and/or in an experimental setting), and/or (2) produced, prepared, and/or manufactured by the hand of man.

As used herein, the term "messenger RNA (mRNA)" refers to a polyribonucleotide that encodes at least one polypeptide. mRNA as used herein encompasses both modified and unmodified mRNA. mRNA may contain one or more coding and non-coding regions. mRNA can be purified from natural sources, produced using recombinant expression systems and optionally purified, in vitro transcribed, or chemically synthesized.

As used herein, the term "mRNA integrity" generally refers to the quality of mRNA. In some embodiments, mRNA integrity refers to the percentage of mRNA that is not degraded after a purification process (e.g., a method described herein). mRNA integrity may be determined using methods particularly described herein, such as TAE Agarose gel electrophoresis or by SDS-PAGE with silver staining, or by methods well known in the art, for example, by RNA agarose gel electrophoresis (e.g., Ausubel et al., John Wiley & Sons, Inc., 1997, Current Protocols in Molecular Biology).

As used herein, the term "pharmaceutically acceptable" refers to substances that, within the scope of sound medical judgment, are suitable for use in contact with the tissues of human beings and animals without excessive toxicity, irritation, allergic response, or other problem or complication, commensurate with a reasonable benefit/risk ratio.

A "pharmaceutically acceptable excipient" means an excipient that is suitable for preparing a pharmaceutical composition that is generally safe, non-toxic and neither biologically nor otherwise undesirable, and includes excipient that is acceptable for veterinary use as well as human pharmaceutical use. A "pharmaceutically acceptable excipient" as used in the specification and claims includes both one and more than one such excipient.

Typically, a suitable mRNA solution may also contain a buffering agent and/or salt. Generally, buffering agents can include HEPES, ammonium sulfate, sodium bicarbonate, sodium citrate, sodium acetate, potassium phosphate and sodium phosphate.

As used herein, the term "substantially" refers to the qualitative condition of exhibiting total or near-total extent or degree of a characteristic or property of interest. One of ordinary skill in the biological arts will understand that biological and chemical phenomena rarely, if ever, go to completion and/or proceed to completeness or achieve or avoid an absolute result. The term "substantially" is therefore used herein to capture the potential lack of completeness inherent in many biological and chemical phenomena. Therefore, a composition substantially free of a compound 'x' would be understood to comprise less than 5% of the compound 'x', or less than 1%, or less than 0.1% or less than 0.01% of the compound 'x'. Unless otherwise defined, all technical and scientific terms used herein have the same meaning as commonly understood by one of ordinary skill in the art to which this application belongs and as commonly used in the art to which this application belongs; such art is incorporated by reference in its entirety. In the case of conflict, the present Specification, including definitions, will control.

DETAILED DESCRIPTION

The present invention relates to methods for preparing scalable quantities of pure and high-quality mRNA. mRNA is typically synthesized by in vitro transcription (IVT) using polymerases such as SP6 or T7-polymerase, then capped and tailed to generate the full length in vivo translatable mRNA. However, proteins associated with mRNA synthesis and/or capping and tailing reactions (the "process enzymes") are difficult to remove from the mRNA product using conventional purification methods. As a result, the purification process often involves multiple precipitation steps to isolate the mRNA from contaminant proteins. Since mRNA is structurally labile and prone to agitation-related degradation, repeated precipitation, centrifugation and/or filtering steps are likely to affect the mRNA integrity, which is undesirable for downstream therapeutic use.

The present inventions is based, at least in part, on a surprising and unexpected discovery that when a buffer comprising higher than conventional concentrations of Guanidine salt (such as Guanidine Thiocyanate) is utilized for mRNA precipitation and processing, a significant improvement in the removal of the contaminating proteins is observed. Additionally, in some embodiments, when the buffer comprising high concentration Guanidine salt further comprises a detergent as described in the invention, the precipitating buffer shows higher efficiency in removal of protein contaminants from the mRNA preparation in comparison to the no-detergent precipitating buffer. In some embodiments, the buffer comprises Guanidine thiocynate-Sodium Citrate, N-lauryl sarcosine (GSCN). Guanidine Thiocyanate and GSCN are often used interchangeably throughout the application in the context of the denaturing buffer. In some embodiments, using the buffer and the method of the invention as described results in generating purified mRNA of high quality after a single precipitation step. In some embodiments, the term "process enzymes" include enzymes, or proteins, or protein fragments thereof. In some embodiments, the process enzymes may include but are not limited to polymerases, or phosphatases, or kinases, or guanylyl transferases, or other proteins, or fragments thereof. In some embodiments, the term protein contaminants, as used herein, may include contaminating enzymes, proteins or protein fragments thereof, which may include polypeptides or oligopeptides (peptides).

In addition, the buffer and method of the invention is scalable to produce large quantities of purified mRNA in a batch. Thus the method and composition of the invention provides advantages in reducing the number of steps in a large scale manufacturing process.

In some embodiments, a large scale purification may include purifying a composition comprising 1 gram mRNA or more, such as, 5 grams or more, 10 grams or more, 20 grams or more, 50 grams or more, 100 grams or more, 150 grams or more, 200 grams or more, 500 grams or more, 1000 grams or more, or 10,000 grams or more of mRNA. In some embodiments, a large scale mRNA synthesis process yields greater than about 1 gram mRNA, or greater than about 10 grams of mRNA, or greater than about 20 grams, or greater than about 50 grams, or greater than about 100 grams, or greater than about 150 grams, or greater than about 200 grams, or greater than about 500 grams, or greater than about 1000 grams, or greater than about 10,000 grams mRNA.

Messenger RNA

The purification methods described herein are suitable for purification of any mRNA. The present invention may be used to purify mRNAs encoding a variety of proteins (e.g., polypeptides) or peptides.

According to various embodiments, the present invention may be used to purify in vitro synthesized mRNA of a variety of lengths. In some embodiments, the present invention may be used to purify in vitro synthesized mRNA of or greater than about 1 kb, 1.5 kb, 2 kb, 2.5 kb, 3 kb, 3.5 kb, 4 kb, 4.5 kb, 5 kb, 6 kb, 7 kb, 8 kb, 9 kb, 10 kb, 11 kb, 12 kb, 13 kb, 14 kb, 15 kb, or 20 kb in length. In some embodiments, the present invention may be used to purify in vitro synthesized mRNA ranging from about 1-20 kb, about 1-15 kb, about 1-10 kb, about 5-20 kb, about 5-15 kb, about 5-12 kb, about 5-10 kb, about 8-20 kb, or about 8-15 kb in length. For example, typical mRNAs may be about 1 kb to about 5 kb in length. More typically, the mRNA will have a length of about 1 kb to about 3 kb. However, in some embodiments, the mRNA in the composition of the invention is much longer (greater than about 20 kb).

In certain embodiments, mRNA nucleotides are modified to provide "modified mRNA." A modified mRNA according to the invention can thus include, for example, backbone modifications, sugar modifications or base modifications. In some embodiments, antibody encoding mRNAs (e.g., heavy chain and light chain encoding mRNAs) may be synthesized from naturally occurring nucleotides and/or nucleotide analogues (modified nucleotides) including, but not limited to, purines (adenine (A), guanine (G)) or pyrimidines (thymine (T), cytosine (C), uracil (U)), and as modified nucleotides analogues or derivatives of purines and pyrimidines, such as e.g. 1-methyl-adenine, 2-methyl-adenine, 2-methylthio-N-6-isopentenyl-adenine, N6-methyl-adenine, N6-isopentenyl-adenine, 2-thio-cytosine, 3-methyl-cytosine, 4-acetyl-cytosine, 5-methyl-cytosine, 2,6-diaminopurine, 1-methyl-guanine, 2-methyl-guanine, 2,2-dimethyl-guanine, 7-methyl-guanine, inosine, 1-methyl-inosine, pseudouracil (5-uracil), dihydro-uracil, 2-thio-uracil, 4-thio-uracil, 5-carboxymethylaminomethyl-2-thio-uracil, 5-(carboxyhydroxymethyl)-uracil, 5-fluoro-uracil, 5-bromo-uracil, 5-carboxymethylaminomethyl-uracil, 5-methyl-2-thio-uracil, 5-methyl-uracil, N-uracil-5-oxyacetic acid methyl ester, 5-methylaminomethyl-uracil, 5-methoxyaminomethyl-2-thio-uracil, 5'-methoxycarbonylmethyl-uracil, 5-methoxy-uracil, uracil-5-oxyacetic acid methyl ester, uracil-5-oxyacetic acid (v), 1-methyl-pseudouracil, queosine, beta-D-mannosyl-queosine, wybutoxosine, and phosphoramidates, phosphorothioates, peptide nucleotides, methylphosphonates, 7-deazaguanosine, 5-methylcytosine and inosine. The preparation of such analogues is known to a person skilled in the art e.g. from the U.S. Pat. Nos. 4,373,071, 4,401,796, 4,415,732, 4,458,066, 4,500,707, 4,668,777, 4,973,679, 5,047,524, 5,132,418, 5,153,319, 5,262,530 and 5,700,642, the disclosure of which is included here in its full scope by reference.

In some embodiments, the present invention may be used to purify in vitro synthesized mRNA that is unmodified.

In some embodiments, mRNA includes a 5' and/or 3' untranslated region (UTR). In some embodiments, a 5' untranslated region includes one or more elements that affect an mRNA's stability or translation, for example, an iron responsive element. In some embodiments, a 5' untranslated region may be between about 50 and 500 nucleotides in length. In some embodiments, a 3' untranslated region includes one or more of a polyadenylation signal, a binding site for proteins that affect an mRNA's stability of location in a cell, or one or more binding sites for miRNAs. In some embodiments, a 3' untranslated region may be between 50 and 500 nucleotides in length or longer. In some embodiments, a 5' untranslated region includes one or more elements that affect an mRNA's stability or translation, for example, an iron responsive element.

Exemplary 3' and/or 5' UTR sequences can be derived from mRNA molecules which are stable (e.g., globin, actin, GAPDH, tubulin, histone, and citric acid cycle enzymes) to increase the stability of the sense mRNA molecule. For example, a 5' UTR sequence may include a partial sequence of a CMV immediate-early 1 (IE1) gene, or a fragment thereof to improve the nuclease resistance and/or improve the half-life of the polynucleotide. Also contemplated is the inclusion of a sequence encoding human growth hormone (hGH), or a fragment thereof to the 3' end or untranslated region of the polynucleotide (e.g., mRNA) to further stabilize the polynucleotide. Generally, these features improve the stability and/or pharmacokinetic properties (e.g., half-life) of the polynucleotide relative to the same polynucleotide without such features, and include, for example features made to improve such polynucleotides' resistance to in vivo nuclease digestion.

mRNA Synthesis mRNAs may be synthesized according to any of a variety of known methods. For example, mRNAs may be synthesized via in vitro transcription (IVT). While the present invention is particularly useful to purify mRNA synthesized by in vitro transcription reactions, it may be used in purification of mRNA generated by any other methods. In some embodiments, mRNA from other sources are contemplated as within the scope of the invention including wild-type mRNA produced from bacteria, fungi, plants, and/or animals.

The presence of reagents and residual enzymes and proteins is undesirable in the final mRNA product according to several embodiments described in the preceding sections, and may thus be referred to as impurities or contaminants. Likewise, a preparation containing one or more of these impurities or contaminants may be referred to as an impure preparation. In some embodiments, the in vitro transcription occurs in a single batch. In some embodiments, IVT reaction includes capping and tailing reactions (C/T). In some embodiments, capping and tailing reactions are performed separately from IVT reaction. In some embodiments, the mRNA is recovered from IVT reaction, followed by a first precipitation and purification of mRNA by methods described in the present application; the recovered purified mRNA is then capped and tailed, and subjected to a second precipitation and purification.

In some embodiments, the present invention may be used to purify a composition or a batch containing at least 10 mg, 50 mg, 100 mg, 200 mg, 300 mg, 400 mg, 500 mg, 600 mg, 700 mg, 800 mg, 900 mg, 1 g, 5 g, 10 g, 25 g, 50 g, 75 g, 100 g, 250 g, 500 g, 750 g, 1 kg, 5 kg, 10 kg, 50 kg, 100 kg, 1000 kg, or more mRNA. In some embodiments, the mRNA molecules are greater than 600, 700, 800, 900, 1000, 2000, 3000, 4000, 5000, 10,000 or more nucleotides in length; also included in the present invention is mRNA having any length in between.

IVT Reaction

IVT is typically performed with a linear or circular DNA template containing a promoter, a pool of ribonucleotide triphosphates, a buffer system that may include DTT and magnesium ions, and an appropriate RNA polymerase (e.g., T3, T7, or SP6 RNA polymerase), DNAse I, pyrophosphatase, and/or RNase inhibitor. The exact conditions will vary according to the specific application. A suitable DNA template typically has a promoter, for example a T3, T7 or SP6 promoter, for in vitro transcription, followed by desired nucleotide sequence for desired mRNA and a termination signal. In some embodiments, the mRNA generated is codon optimized.

In some embodiments, an exemplary IVT reaction mixture contains linearized double stranded DNA template with an SP6 polymerase-specific promoter, SP6 RNA polymerase, RNase inhibitor, pyrophosphatase, 29 mM NTPs, 10 mM DTT and a reaction buffer (when at 10× is 800 mM HEPES, 20 mM spermidine, 250 mM $MgCl_2$, pH 7.7) and quantity sufficient (QS) to a desired reaction volume with RNase-free water; this reaction mixture is then incubated at 37° C. for 60 minutes. The polymerase reaction is then quenched by addition of DNase I and a DNase I buffer (when at 10× is 100 mM Tris-HCl, 5 mM $MgCl_2$ and 25 mM $CaCl_2$), pH 7.6) to facilitate digestion of the double-stranded DNA template in preparation for purification. This embodiment has been shown to be sufficient to produce 100 grams of mRNA Other IVT methods are available in the art and may be used to practice the present invention.

Capping and Tailing (C/T) Reactions

Typically, in eukaryotic organisms, mRNA processing comprises the addition of a "cap" on the N-terminal (5') end, and a "tail" on the C-terminal (3') end. A typical cap is a 7-methylguanosine cap, which is a guanosine that is linked through a 5'-5'-triphosphate bond to the first transcribed nucleotide. The presence of the cap is important in providing resistance to nucleases found in most eukaryotic cells. In some embodiment, the in vitro transcribed mRNA is modified enzymatically by the addition of a 5' $N^7$-methylguanylate Cap 0 structure using guanylate transferase and the addition of a methyl group at the 2' O position of the penultimate nucleotide resulting in a Cap 1 structure using 2' O-methyltransferase as described by Fechter, P.; Brownlee, G. G. "Recognition of mRNA cap structures by viral and cellular proteins" *J. Gen. Virology* 2005, 86, 1239-1249.

In some embodiments, a 5' cap is typically added as follows: first, an RNA terminal phosphatase removes one of the terminal phosphate groups from the 5' nucleotide, leaving two terminal phosphates; guanosine triphosphate (GTP) is then added to the terminal phosphates via a guanylyl transferase, producing a 5'-5' triphosphate linkage; and the 7-nitrogen of guanine is then methylated by a methyltransferase. Examples of cap structures include, but are not limited to, m7G(5')ppp (5')G, G(5')ppp(5')A and G(5')ppp (5')G. Briefly, purified IVT mRNA is typically mixed with GTP, S-adenosyl methionine, RNase inhibitor, 2'-Omethyl transferase, guanylyl transferase, in the presence of a reaction buffer comprising Tris-HCl, $MgCl_2$, and RNase-free $H_2O$; then incubated at 37° C.

In some embodiments, following addition of the Cap 1 structure, a poly-adenylate tail is added to the 3' end of the in vitro transcribed mRNA enzymatically using poly-A polymerase. The tail is typically a polyadenylation event whereby a polyadenylyl moiety is added to the 3' end of the mRNA molecule. In some embodiments, following the incubation for capping reaction, a tailing reaction is initiated by adding tailing buffer comprising Tris-HCl, NaCl, $MgCl_2$, ATP, poly A polymerase and RNase-free H$_2$O. The reaction is quenched by addition of EDTA.

The presence of this "tail" serves to protect the mRNA from exonuclease degradation. The 3' tail may be added before, after or at the same time of adding the 5' Cap.

In some embodiments, the poly A tail is 25-5,000 nucleotides in length. Typically, a tail structure includes a poly A and/or poly C tail. (A, adenosine; C, cytosine). In some embodiments, a poly-A or poly-C tail on the 3' terminus of mRNA includes at least 50 adenosine or cytosine nucleotides, at least 150 adenosine or cytosine nucleotides, at least 200 adenosine or cytosine nucleotides, at least 250 adenosine or cytosine nucleotides, at least 300 adenosine or cytosine nucleotides, at least 350 adenosine or cytosine nucleotides, at least 400 adenosine or cytosine nucleotides, at least 450 adenosine or cytosine nucleotides, at least 500 adenosine or cytosine nucleotides, at least 550 adenosine or cytosine nucleotides, at least 600 adenosine or cytosine nucleotides, at least 650 adenosine or cytosine nucleotides, at least 700 adenosine or cytosine nucleotides, at least 750 adenosine or cytosine nucleotides, at least 800 adenosine or cytosine nucleotides, at least 850 adenosine or cytosine nucleotides, at least 900 adenosine or cytosine nucleotides, at least 950 adenosine or cytosine nucleotides, or at least 1 kb adenosine or cytosine nucleotides, respectively. In some embodiments, a poly-A or poly-C tail may be about 10 to 800 adenosine or cytosine nucleotides (e.g., about 10 to 200 adenosine or cytosine nucleotides, about 10 to 300 adenosine or cytosine nucleotides, about 10 to 400 adenosine or cytosine nucleotides, about 10 to 500 adenosine or cytosine nucleotides, about 10 to 550 adenosine or cytosine nucleotides, about 10 to 600 adenosine or cytosine nucleotides, about 50 to 600 adenosine or cytosine nucleotides, about 100 to 600 adenosine or cytosine nucleotides, about 150 to 600 adenosine or cytosine nucleotides, about 200 to 600 adenosine or cytosine nucleotides, about 250 to 600 adenosine or cytosine nucleotides, about 300 to 600 adenosine or cytosine nucleotides, about 350 to 600 adenosine or cytosine nucleotides, about 400 to 600 adenosine or cytosine nucleotides, about 450 to 600 adenosine or cytosine nucleotides, about 500 to 600 adenosine or cytosine nucleotides, about 10 to 150 adenosine or cytosine nucleotides, about 10 to 100 adenosine or cytosine nucleotides, about 20 to 70 adenosine or cytosine nucleotides, or about 20 to 60 adenosine or cytosine nucleotides) respectively. In some embodiments, a tail structure includes is a combination of poly A and poly C tails with various lengths described herein. In some embodiments, a tail structure includes at least 50%, 55%, 65%, 70%, 75%, 80%, 85%, 90%, 92%, 94%, 95%, 96%, 97%, 98%, or 99% adenosine nucleotides. In some embodiments, a tail structure includes at least 50%, 55%, 65%, 70%, 75%, 80%, 85%, 90%, 92%, 94%, 95%, 96%, 97%, 98%, or 99% cytosine nucleotides.

Other capping and/or tailing methods are available in the art and may be used to practice the present invention.

Contaminants in In Vitro Synthesized mRNA

An mRNA product from the synthesis process, for example as described above, is likely to contain various contaminants (also referred to as impurities) including residual template DNA, aborted products, enzymes, including polymerase, for example SP6, or T7-polymerase, capping enzyme, for example guanylyl transferase, or methyl guanylyl transferase, DNase 1, various salts, and prematurely aborted mRNA oligonucleotides, which are byproducts of an mRNA synthesis reaction.

mRNA Purification

A purification process according to the present invention may be carried out during or subsequent to synthesis. For example, mRNA may be purified as described herein before a cap and/or tail are added to the mRNA. In some embodiments, the mRNA is purified after a cap and/or tail are added to the mRNA. In some embodiments, the mRNA is purified after a cap is added. In some embodiments, the mRNA is purified both before and after a cap and/or tail are added to the mRNA. In general, a purification step as described herein may be performed after each step of mRNA synthesis, optionally along with other purification processes, such as dialysis.

Precipitation of mRNA

According to the present invention, mRNA in an impure preparation, such as an in vitro synthesis reaction mixture may be precipitated using a buffer and suitable conditions described herein, followed by various methods of purification known in the art. As used herein, the term "precipitation" (or any grammatical equivalent thereof) refers to the formation of an insoluble substance (e.g., solid) in a solution. When used in connection with mRNA, the term "precipitation" refers to the formation of insoluble or solid form of mRNA in a liquid.

Typically, mRNA precipitation involves a denaturing condition. As used herein, the term "denaturing condition" refers to any chemical or physical condition that can cause disruption of native confirmation of mRNA. Since the native conformation of a molecule is usually the most water soluble, disrupting the secondary and tertiary structures of a molecule may cause changes in solubility and may result in precipitation of mRNA from solution.

For example, a suitable method of precipitating mRNA from an impure preparation involves treating the impure preparation with a denaturing reagent such that the mRNA precipitates. Exemplary denaturing reagents suitable for the invention include, but are not limited to, lithium chloride, sodium chloride, potassium chloride, guanidinium chloride, guanidinium thiocyanate, guanidinium isothiocyanate, ammonium acetate and combinations thereof. Suitable reagent may be provided in a solid form or in a solution.

In some embodiments, a guanidinium salt is used in a denaturation buffer for precipitating mRNA. As non-limiting examples, guanidinium salts may include guanidinium chloride, guanidinium thiocyanate, or guanidinium isothiocyanate. Guanidinium thiocyanate, also termed as guanidine thiocyanate may be used to precipitate mRNA. The present invention is based on the surprising discovery that in an mRNA precipitating buffer comprising guanidinium salts, such as Guanidinium thiocyanate can be used at a concentration higher than is typically used for denaturing reactions, resulting in mRNA that is substantially free of protein contaminants. In some embodiments, a solution suitable for mRNA precipitation contains guanidine thiocyanate at a concentration greater than 4 M.

According to the present invention, in some embodiments, a buffer comprising a denaturing reagent suitable for mRNA precipitation comprises greater than 4 M guanidine thiocyanate. In some embodiments, a buffer comprising a denaturing reagent suitable for mRNA precipitation comprises about 5 M GSCN. In some embodiments, a buffer comprising a denaturing reagent suitable for mRNA precipitation comprises about 5.5 M GSCN. In some embodiments, a buffer comprising a denaturing reagent suitable for mRNA precipitation comprises about 6 M GSCN. In some embodiments, a buffer comprising a denaturing reagent suitable for mRNA precipitation comprises about 6.5 M GSCN. In some embodiments, a buffer comprising a denaturing reagent suitable for mRNA precipitation comprises about 7 M GSCN. In some embodiments, a buffer comprising a denaturing reagent suitable for mRNA precipitation comprises about 7.5 M GSCN. In some embodiments, a buffer comprising a denaturing reagent suitable for mRNA precipitation comprises about 8 M GSCN. In some embodiments, a buffer comprising a denaturing reagent suitable for mRNA precipitation comprises about 8.5 M GSCN. In some embodiments, a buffer comprising a denaturing reagent suitable for mRNA precipitation comprises about 9 M GSCN. In some embodiments, a buffer comprising a denaturing reagent suitable for mRNA precipitation comprises about 10 M GSCN. In some embodiments, a buffer comprising a denaturing reagent suitable for mRNA precipitation comprises greater than 10 M GSCN.

In addition to denaturing reagent, a suitable solution for mRNA precipitation may include additional salt, surfactant and/or buffering agent. For example, a suitable solution may further include sodium lauryl sarcosyl and/or sodium citrate. In some embodiments, a buffer suitable for mRNA precipitation comprises about 5 mM sodium citrate. In some embodiments, a buffer suitable for mRNA precipitation comprises about 10 mM sodium citrate. In some embodiments, a buffer suitable for mRNA precipitation comprises about 20 mM sodium citrate. In some embodiments, a buffer suitable for mRNA precipitation comprises about 25 mM sodium citrate. In some embodiments, a buffer suitable for mRNA precipitation comprises about 30 mM sodium citrate. In some embodiments, a buffer suitable for mRNA precipitation comprises about 50 mM sodium citrate.

In some embodiments, a buffer suitable for mRNA precipitation comprises a surfactant, such as N-Lauryl Sarcosine (Sarcosyl). In some embodiments, a buffer suitable for mRNA precipitation comprises about 0.01% N-Lauryl Sarcosine. In some embodiments, a buffer suitable for mRNA precipitation comprises about 0.05% N-Lauryl Sarcosine. In some embodiments, a buffer suitable for mRNA precipitation comprises about 0.1% N-Lauryl Sarcosine. In some embodiments, a buffer suitable for mRNA precipitation comprises about 0.5% N-Lauryl Sarcosine. In some embodiments, a buffer suitable for mRNA precipitation comprises 1% N-Lauryl Sarcosine. In some embodiments, a buffer suitable for mRNA precipitation comprises about 1.5% N-Lauryl Sarcosine. In some embodiments, a buffer suitable for mRNA precipitation comprises about 2%, about 2.5% or about 5% N-Lauryl Sarcosine.

In some embodiments, a suitable solution for mRNA precipitation comprises a reducing agent. In some embodiments, the reducing agent is selected from dithiothreitol (DTT), beta-mercaptoethanol (b-ME), Tris(2-carboxyethyl) phosphine (TCEP), Tris(3-hydroxypropyl)phosphine (THPP), dithioerythritol (DTE) and dithiobutylamine (DTBA). In some embodiments, the reducing agent is dithiothreitol (DTT).

In some embodiments, DTT is present at a final concentration that is greater than 1 mM and up to about 200 mM. In some embodiments, DTT is present at a final concentration between 2.5 mM and 100 mM. In some embodiments, DTT is present at a final concentration between 5 mM and 50 mM.

In some embodiments, DTT is present at a final concentration of 1 mM or greater. In some embodiments, DTT is present at a final concentration of 2 mM or greater. In some embodiments, DTT is present at a final concentration of 3 mM or greater. In some embodiments, DTT is present at a final concentration of 4 mM or greater. In some embodiments, DTT is present at a final concentration of 5 mM or greater. In some embodiments, DTT is present at a final concentration of 6 mM or greater. In some embodiments, DTT is present at a final concentration of 7 mM or greater. In some embodiments, DTT is present at a final concentration of 8 mM or greater. In some embodiments, DTT is present at a final concentration of 9 mM or greater. In some embodiments, DTT is present at a final concentration of 10 mM or greater. In some embodiments, DTT is present at a final concentration of 11 mM or greater. In some embodiments, DTT is present at a final concentration of 12 mM or greater. In some embodiments, DTT is present at a final concentration of 13 mM or greater. In some embodiments, DTT is present at a final concentration of 14 mM or greater. In some embodiments, DTT is present at a final concentration of 15 mM or greater. In some embodiments, DTT is present at a final concentration of 16 mM or greater. In some embodiments, DTT is present at a final concentration of 17 mM or greater. In some embodiments, DTT is present at a final concentration of 18 mM or greater. In some embodiments, DTT is present at a final concentration of 19 mM or greater. In some embodiments, DTT is present at a final concentration of about 20 mM.

In some embodiments, the denaturing buffer comprises 2 M GSCN or greater, and DTT. In some embodiments, the denaturing buffer comprises 3 M GSCN or greater, and DTT. In some embodiments, the denaturing buffer comprises 4 M GSCN or greater, and DTT. In some embodiments, the denaturing buffer comprises about 5 M GSCN or greater, and DTT. In some embodiments, the denaturing buffer comprises about 6 M GSCN or greater, and DTT. In some embodiments, the denaturing buffer comprises about 7 M GSCN or greater, and DTT. In some embodiments, the denaturing buffer comprises about 8 M GSCN or greater, and DTT. In some embodiments, the denaturing buffer comprises about 9 M GSCN or greater, and DTT.

In some embodiments, the denaturing buffer comprises 1 mM DTT or greater and GSCN concentration of about 5 M. In some embodiments, the denaturing buffer comprises 2 mM DTT or greater and GSCN concentration of about 5 M. In some embodiments, the denaturing buffer comprises 3 mM DTT or greater and GSCN concentration of about 5 M. In some embodiments, the denaturing buffer comprises 4 mM DTT or greater and GSCN concentration of about 5 M. In some embodiments, the denaturing buffer comprises 5 mM DTT or greater and GSCN concentration of about 5 M. In some embodiments, the denaturing buffer comprises 6 mM DTT or greater and GSCN concentration of about 5 M. In some embodiments, the denaturing buffer comprises 7 mM DTT or greater and GSCN concentration of about 5 M. In some embodiments, the denaturing buffer comprises 8 mM DTT or greater and GSCN concentration of about 5 M. In some embodiments, the denaturing buffer comprises 9 mM DTT or greater and GSCN concentration of about 5 M. In some embodiments, the denaturing buffer comprises 10 mM DTT or greater and GSCN concentration of about 5 M.

Protein denaturation may occur even at a low concentration of the denaturation reagent, when in the presence or absence of the reducing agent. The combination of a high concentration of GSCN and a high concentration of DTT in a denaturing solution as provided by the methods of the invention is surprising and unexpected, since, for instance, it is a highly chaotropic solution. Unexpectedly, such a combination when used for precipitating an mRNA containing impurities in accordance to the methods of the invention, yields mRNA which is surprisingly pure and substantially free of protein contaminants. mRNA precipitated in the buffer according to the methods of the invention can be processed through a filter. In some embodiments, the eluent after a single precipitation followed by filtration using the buffer comprising about 5 M GSCN and about 10 mM DTT is of surprisingly high quality and purity with no detectable protein impurities. Additionally, the method is reproducible at wide range of the amount of mRNA processed, in the scales involving about 1 gram, or about 10 grams, or about 100 grams, or about 500 grams, or about 1000 grams of mRNA and more, without causing hindrance in flow of fluids through a filter.

In some embodiments, the buffer for the precipitating step further comprises an alcohol. In some embodiments, the precipitating is performed under conditions where the mRNA, denaturing buffer (comprising GSCN and reducing agent, e.g. DTT) and alcohol are present in a volumetric ratio of 1:(5):(3). In some embodiments, the precipitating is performed under conditions where the mRNA, denaturing buffer and alcohol are present in a volumetric ratio of 1:(3.5):(2.1). In some embodiments, the precipitating is performed under conditions where the mRNA, denaturing buffer and alcohol are present in a volumetric ratio of 1:(4):(2). In some embodiments, the precipitating is performed under conditions where the mRNA, denaturing buffer and alcohol are present in a volumetric ratio of 1:(2.8):(1.9). In some embodiments, the precipitating is performed under conditions where the mRNA, denaturing buffer and alcohol are present in the volumetric ratio of 1:(2.3):(1.7). In some embodiments, the precipitating is performed under conditions where the mRNA, denaturing buffer and alcohol are present in the volumetric ratio of 1:(2.1):(1.5).

In some embodiments, it is desirable to incubate the impure preparation with one or more denaturing reagents described herein for a period of time at a desired temperature that permits precipitation of substantial amount of mRNA. For example, the mixture of an impure preparation and a denaturing agent may be incubated at room temperature or ambient temperature for a period of time. In some embodiments, a suitable incubation time is a period of or greater than about 2, 3, 4, 5, 6, 7, 8, 9, 10, 15, 20, 25, 30, 40, 50, or 60 minutes. In some embodiments, a suitable incubation time is a period of or less than about 60, 55, 50, 45, 40, 35, 30, 25, 20, 15, 10, 9, 8, 7, 6, or 5 minutes. In some embodiments, the mixture is incubated for about 5 minutes at room temperature. Typically, "room temperature" or "ambient temperature" refers to a temperature with the range of about 20-25° C., for example, about 20° C., 21° C., 22° C., 23° C., 24° C., or 25° C. In some embodiments, the mixture of an impure preparation and a denaturing agent may also be incubated above room temperature (e.g., about 30-37° C. or in particular, at about 30° C., 31° C., 32° C., 33° C., 34° C., 35° C., 36° C., or 37° C.) or below room temperature (e.g., about 15-20° C., or in particular, at about 15° C., 16° C., 17° C., 18° C., 19° C., or 20° C.). The incubation period may be adjusted based on the incubation temperature. Typically, a higher incubation temperature requires shorter incubation time.

Alternatively or additionally, a solvent may be used to facilitate mRNA precipitation. Suitable exemplary solvent includes, but is not limited to, isopropyl alcohol, acetone, methyl ethyl ketone, methyl isobutyl ketone, ethanol, methanol, denatonium, and combinations thereof. For example, a solvent (e.g., absolute ethanol) may be added to an impure preparation together with a denaturing reagent or after the addition of a denaturing reagent and the incubation as described herein, to further enhance and/or expedite mRNA precipitation. Typically, after the addition of a suitable solvent (e.g., absolute ethanol), the mixture may be incubated at room temperature for another period of time. Typically, a suitable period of incubation time is or greater than about 2, 3, 4, 5, 6, 7, 8, 9, 10, 15, 20, 25, 30, 40, 50, or 60 minutes. In some embodiments, a suitable period of incubation is a period of or less than about 60, 55, 50, 45, 40, 35, 30, 25, 20, 15, 10, 9, 8, 7, 6, or 5 minutes. Typically, the mixture is incubated at room temperature for about 5 minutes. Temperature above or below room may be used with proper adjustment of incubation time. Alternatively, incubation could occur at 4° C. or −20° C. for precipitation.

mRNA Recovery

As a result of precipitation, a suspension containing precipitated mRNA and various contaminants is formed. In some embodiments, the suspension mixture is subjected to filtration for separation and recovery of the mRNA. In some embodiments, tangential flow filtration (TFF) is used for separation of mRNA from contaminants after precipitation. Additional teaching on TFF for mRNA purification may be obtained from the related applications by Applicant, U.S. Ser. No. 14/775,915, filed on Sep. 14, 2015, which issued as U.S. Pat. No. 9,957,499 on May 1, 2018, entitled "METHODS FOR PURIFICATION OF MESSENGER RNA"; or U.S. Ser. No. 14/696,140 filed on Apr. 24, 2015, which issued as U.S. Pat. No. 9,850,269 on Dec. 26, 2017 entitled "METHODS FOR PURIFICATION OF MESSENGER RNA", or U.S. Ser. No. 15/831,252 filed on Dec. 4, 2017 as a continuation application of U.S. Ser. No. 14/696,140, the subject matter of each of which is hereby incorporated in their entirety by reference. In some embodiments, the precipitated mRNA and contaminants is subjected to a normal flow filtration. Additional teaching on normal flow filtration (NFF) for mRNA purification may be obtained from the related applications by Applicant, U.S. 62/722,674, filed on Aug. 24, 2018, which is incorporated in its entirety by reference. In some embodiments, the mRNA is recovered by centrifugation. Additional teachings may be obtained from related applications by Applicant, U.S. Ser. No. 15/907,086, filed on Feb. 27, 2018, entitled, "METHODS FOR PURIFICATION OF MESSENGER RNA"; U.S. Ser. No. 15/906,864 filed on Feb. 27, 2018, entitled, "METHODS FOR PURIFICATION OF MESSENGER RNA" which encompasses a purification method using Nutsche filter; or, U.S. Ser. No. 15/907,163 filed on Feb. 27, 2018, entitled, "LARGE SCALE SYNTHESIS OF MESSENGER RNA", the subject matters of each of which is hereby incorporated in their entirety by reference. In some embodiments, the precipitated mRNA as described in the preceding section is subjected to chromatographic separation or any other known methods in the art for recovery of the pure mRNA.

In some embodiments, methods described herein result in precipitation and recovery of a substantial amount of mRNA from an impure preparation. In some embodiments, methods described herein result in precipitation and recovery of at least about 80%, 85%, 90%, 95%, 96%, 97%, 98%, or 99% of total mRNA from an impure preparation. In some embodiments, methods described herein result in precipitation and recovery of at least 80% of total mRNA from an impure preparation. In some embodiments, methods described herein result in precipitation and recovery of substantially 90% of total mRNA from an impure preparation. In some embodiments, methods described herein result in precipitation and recovery of substantially 91% of total mRNA from an impure preparation. In some embodiments, methods described herein result in precipitation and recovery of substantially 92% of total mRNA from an impure preparation. In some embodiments, methods described herein result in precipitation and recovery of substantially 93% of total mRNA from an impure preparation. In some embodiments, methods described herein result in precipitation and recovery of substantially 94% of total mRNA from an impure preparation. In some embodiments, methods described herein result in precipitation and recovery of substantially 95% of total mRNA from an impure preparation. In some embodiments, methods described herein result in precipitation and recovery of substantially 96% of total mRNA from an impure preparation. In some embodiments, methods described herein result in precipitation and recovery of substantially 97% of total mRNA from an impure preparation. In some embodiments, methods described herein result in precipitation and recovery of substantially 98% of total mRNA from an impure preparation. In some embodiments, methods described herein result in precipitation and recovery of substantially 99% of total mRNA from an impure preparation. In some embodiments, methods described herein result in precipitation and recovery of substantially 100% of total mRNA from an impure preparation.

In some embodiments, mRNA purified by methods disclosed herein comprises less than 10%, less than 9%, less than 8%, less than 7%, less than 6%, less than 5%, less than 4%, less than 3%, less than 2%, less than 1%, less than 0.5%, less than 0.1% impurities other than full-length mRNA determined by various detection methods described herein and known in the art (e.g., capillary electrophoresis, gel electrophoresis, HPLC, or UPLC). The impurities include IVT contaminants, e.g., proteins, enzymes, free nucleotides and/or "short abortive transcripts" (shortmers). As used herein, the term "shortmers" or refers to any transcripts that are less than full-length. In some embodiments, "shortmers" or "abortive transcripts" are less than 100 nucleotides in length, less than 90, less than 80, less than 70, less than 60, less than 50, less than 40, less than 30, less than 20, or less than 10 nucleotides in length. In some embodiments, shortmers are detected or quantified after adding a 5'-cap, and/or a 3'-poly A tail.

Among other things, the purification methods described herein may be used to manufacture mRNA for therapeutic use. The purity and/or integrity of purified mRNA determined by various characterization techniques described herein may be used as batch release criteria. In some embodiments, the release criteria of a batch production of mRNA in a manufacturing process includes capillary electrophoretic determination of one or more of the following: the purified mRNA comprises 5% or less, 4% or less, 3% or less, 2% or less, 1% or less, or substantially free of protein contaminants; the purified mRNA comprises 5%, or less, 4% or less, 3% or less, 2% or less, 1% or less, or substantially free of short abortive RNA contaminants; the purified mRNA comprises 5% or less, 4% or less, 3% or less, 2% or less, 1% or less, or substantially free of salt contaminants; the purified mRNA comprises 95% or greater, 96% or greater, 97% or greater, 98% or greater or 99% or greater integrity.

In some embodiments, the release criteria of a batch production of mRNA in a manufacturing process includes HPLC determination of one or more of the following: the purified mRNA comprises 5% or less, 4% or less, 3% or less, 2% or less, 1% or less, or substantially free of protein contaminants; the purified mRNA comprises 5% or less, 4% or less, 3% or less, 2% or less, 1% or less, or substantially free of short abortive RNA contaminants; the purified mRNA comprises 5% or less, 4% or less, 3% or less, 2% or less, 1% or less, or substantially free of salt contaminants; the purified mRNA comprises 95% or greater, 96% or greater, 97% or greater, 98% or greater or 99% or greater integrity.

Additionally, mRNA purified according to the present invention results in a high yield. For example, the total purified mRNA is recovered in an amount that results in a yield of at least about 70%, 75%, 85%, 90%, 91%, 92%, 93%, 94%, 95%, 96%, 97%, 98% or 99%.

According to the present invention, mRNA may be purified in a large scale. For example, at least 0.5 grams, 1 gram, 5 grams, 10 grams, 15 grams, 20 grams, 35 grams, 40 grams, 45 grams, 50 grams, 60 grams, 70 grams, 80 grams, 90 grams, 100 grams, 200 grams, 300 grams, 400 grams, 500 grams, 1 kilogram, 10 kilograms, 50 kilograms, 100 kilograms of mRNA may be purified in a single batch.

mRNA Therapeutic Compositions mRNA purified according to the present invention may be delivered as naked mRNA (unpackaged) or via delivery vehicles. As used herein, the terms "delivery vehicle," "transfer vehicle," "nanoparticle" or grammatical equivalent, are used interchangeably.

Delivery vehicles can be formulated in combination with one or more additional nucleic acids, carriers, targeting ligands or stabilizing reagents, or in pharmacological compositions where it is mixed with suitable excipients. Techniques for formulation and administration of drugs may be found in "Remington's Pharmaceutical Sciences," Mack Publishing Co., Easton, PA., latest edition. A particular delivery vehicle is selected based upon its ability to facilitate the transfection of a nucleic acid to a target cell.

According to various embodiments, suitable delivery vehicles include, but are not limited to polymer based carriers, such as polyethylenimine (PEI), lipid nanoparticles (LNPs) and liposomes, nanoliposomes, ceramide-containing nanoliposomes, proteoliposomes, both natural and synthetically-derived exosomes, natural, synthetic and semi-synthetic lamellar bodies, nanoparticulates, calcium phosphorsilicate nanoparticulates, calcium phosphate nanoparticulates, silicon dioxide nanoparticulates, nanocrystalline particulates, semiconductor nanoparticulates, poly (D-arginine), sol-gels, nanodendrimers, starch-based delivery systems, micelles, emulsions, niosomes, multi-domain-block polymers (vinyl polymers, polypropyl acrylic acid polymers, dynamic polyconjugates), dry powder formulations, plasmids, viruses, calcium phosphate nucleotides, aptamers, peptides and other vectorial tags.

In some embodiments, a suitable delivery vehicle is a liposomal delivery vehicle, e.g., a lipid nanoparticle (LNP) or liposome. In some embodiments, liposomes may comprise one or more cationic lipids. In some embodiments, a liposome comprises one or more cationic lipids, one or more non-cationic lipids, and one or more PEG-modified lipids. In some embodiments, a liposome comprises at least one or more PEG-modified lipids. In some embodiments, a liposome comprises no more than four distinct lipid components. In some embodiments, a liposome comprises no more than three distinct lipid components. In some embodiments, one distinct lipid component is a sterol-based cationic lipid.

As used herein, the term "cationic lipids" refers to any of a number of lipid and lipidoid species that have a net positive charge at a selected pH, such as at physiological pH. Several cationic lipids have been described in the literature, many of which are commercially available.

In some embodiments an mRNA encodes an intracellular protein or peptide. In some embodiments, an mRNA encodes a cytosolic protein. In some embodiments, an mRNA encodes a protein associated with the actin cytoskeleton. In some embodiments, an mRNA encodes a protein associated with the plasma membrane. In some specific embodiments, an mRNA encodes a transmembrane protein. In some specific embodiments an mRNA encodes an ion channel protein. In some embodiments, an mRNA encodes a perinuclear protein. In some embodiments, an mRNA encodes a nuclear protein. In some specific embodiments, an mRNA encodes a transcription factor. In some embodiments, an mRNA encodes a chaperone protein. In some embodiments, an mRNA encodes an intracellular enzyme (e.g, mRNA encoding an enzyme associated with urea cycle or lysosomal storage metabolic disorders). In some embodiments, an mRNA encodes a protein involved in cellular metabolism, DNA repair, transcription and/or translation. In some embodiments, an mRNA encodes an extracellular protein or peptide. In some embodiments, an mRNA encodes a protein or peptide associated with the extracellular matrix. In some embodiments an mRNA encodes a secreted protein or peptide. In specific embodiments, an mRNA used in the composition and methods of the invention may be used to express functional peptides, proteins or enzymes that are excreted or secreted by one or more target cells into the surrounding extracellular fluid (e.g, mRNA encoding hormones and/or neurotransmitters). In some embodiments an mRNA encodes an immunogenic protein for vaccine purposes. In some embodiments an mRNA encodes an antibody or a fragment therefore. In some embodiments, an mRNA encodes a metabolic protein. In some embodiments, an mRNA encodes an enzyme. In some embodiments, an mRNA encodes a receptor protein or peptide. In some embodiments, an mRNA encodes an antigen. In some embodiments, an mRNA encodes a cancer associated antigen. In some embodiments, an mRNA encodes a vaccine.

As non-limiting examples, an mRNA encodes a protein or peptide such as ABC7, ABCB3, ABCB7, ABCC7, ABCD1, AKT; AKT2, AKT3, ATF4, ALAS2, Alpha galactosidase, Alpha-1 Protease inhibitor, APA, APC; APOA1, APOA1-Milano, APOE, Anti-trypsin alpha 1, Arginosuccinate synthase, ASAT; ATM; ATP7B, ATR; Atrophin-1; ATX3; Atxn10; ATXN2; Atxn7; ATXN1; Bax; Bcl2; BRCA1; BRCA2; Carbamylphosphate Synthase, CASP8, CBP (Creb-BP); CDKN2a; CFTR, CREB1, CVAP, CYP1B1, DBA, DMD, DMPK; EGFR, EIF2B1, EIF2BA, EIF2B2, EIF2B3, EIF2B5, EIF2B4; ERBB2; ERBB3; ERBB4; Erythropoietin, Factor IX, Factor V; Factor VII, Factor VII; Factor VIII; Factor VIIIa light chain, Factor X; Factor XI (F11); Factor XII deficiency (F12, HAF); Factor XIIIA (F13A1, F13A); Factor XIIIB (F13B); FBN1, FGF Receptor Family members; FHL3; FKRP, FXN/X25; FXR1, G6PC, G6PT, GAA, Galactose-1-phosphate uridylyltransferase, GLUT2, H1F1a; HBA1; HBB; HBA2, HBB, HBD, Heparan N-sulfatase, HIF; HIF3a; HLH3, HPLH2, HPLH3, Huntingtin, IDH2; IDH1, IGF Receptor; IGF; IGF1R, Igf2 Receptor; Igf2; Igf1 Receptor; Igf1; ITGB2, KIAA1596; Kras; LCRB, Methylmalonyl-CoA mutase, MRP7, MUNC13-4, N-acetyl-alpha-D-glucosaminidase, NOS3, NPC1, OTC (Ornithine transcarbamylase), PAH, PKHD1, PKD1, PKD2, PKD4, PKLR, PKU1, PPAR gamma; PPARalpha; PRF1, PSEN2, PSF2, PTEN; RB, Retinoschisin; RING11, SBMA/SMAXI/AR; SEC63, SERPINA1, SERPINA2, SERPINA3, SERPINA5, SERPINA6, SFTPA1, SFTPB, SFTPC, SFTPD, SLC2A, SLC7A9, SMPD1, SPTB, TAP2, TAPBP, TPSN, UNC13D, VEGF-a, VEGF-b, VEGF-c, VLDLR; and WT1.

Accordingly, in certain embodiments the present invention provides a method for producing a therapeutic composition comprising purified mRNA that encodes a peptide or polypeptide for use in the delivery to or treatment of the lung of a subject or a lung cell. In certain embodiments the present invention provides a method for producing a therapeutic composition comprising purified mRNA that encodes an endogenous protein which may be deficient or non-functional in a subject. In certain embodiments the present invention provides a method for producing a therapeutic composition comprising purified mRNA that encodes an endogenous protein which may be deficient or non-functional in a subject.

In certain embodiments the present invention provides a method for producing a therapeutic composition comprising purified mRNA that encodes a peptide or polypeptide for use in the delivery to or treatment of the lung of a subject or a lung cell. In certain embodiments the present invention is useful in a method for manufacturing mRNA encoding cystic fibrosis transmembrane conductance regulator, CFTR. The CFTR mRNA is delivered to the lung of a subject in need in a therapeutic composition for treating cystic fibrosis. In certain embodiments the present invention provides a method for producing a therapeutic composition comprising purified mRNA that encodes a peptide or polypeptide for use in the delivery to or treatment of the liver of a subject or a liver cell. Such peptides and polypeptides can include those associated with a urea cycle disorder, associated with a lysosomal storage disorder, with a glycogen storage disorder, associated with an amino acid metabolism disorder, associated with a lipid metabolism or fibrotic disorder, associated with methylmalonic acidemia, or associated with any other metabolic disorder for which delivery to or treatment of the liver or a liver cell with enriched full-length mRNA provides therapeutic benefit.

In certain embodiments the present invention provides a method for producing a therapeutic composition comprising purified mRNA that encodes for a protein associated with a urea cycle disorder. In certain embodiments the present invention provides a method for producing a therapeutic composition comprising purified mRNA that encodes for ornithine transcarbamylase (OTC) protein. In certain embodiments the present invention provides a method for producing a therapeutic composition comprising purified mRNA that encodes for arginosuccinate synthetase 1 protein. In certain embodiments the present invention provides a method for producing a therapeutic composition comprising purified mRNA that encodes for carbamoyl phosphate synthetase I protein. In certain embodiments the present invention provides a method for producing a therapeutic composition comprising purified mRNA that encodes for arginosuccinate lyase protein. In certain embodiments the present invention provides a method for producing a therapeutic composition comprising purified mRNA that encodes for arginase protein.

In certain embodiments the present invention provides a method for producing a therapeutic composition comprising purified mRNA that encodes for a protein associated with a lysosomal storage disorder. In certain embodiments the present invention provides a method for producing a therapeutic composition comprising purified mRNA that encodes for alpha galactosidase protein. In certain embodiments the present invention provides a method for producing a therapeutic composition comprising purified mRNA that encodes for glucocerebrosidase protein. In certain embodiments the present invention provides a method for producing a therapeutic composition comprising purified mRNA that encodes for iduronate-2-sulfatase protein. In certain embodiments the present invention provides a method for producing a therapeutic composition comprising purified mRNA that encodes for iduronidase protein. In certain embodiments the present invention provides a method for producing a therapeutic composition comprising purified mRNA that encodes for N-acetyl-alpha-D-glucosaminidase protein. In certain embodiments the present invention provides a method for producing a therapeutic composition comprising purified mRNA that encodes for heparan N-sulfatase protein. In certain embodiments the present invention provides a method for producing a therapeutic composition comprising purified mRNA that encodes for galactosamine-6 sulfatase protein. In certain embodiments the present invention provides a method for producing a therapeutic composition comprising purified mRNA that encodes for beta-galactosidase protein. In certain embodiments the present invention provides a method for producing a therapeutic composition comprising purified mRNA that encodes for lysosomal lipase protein. In certain embodiments the present invention provides a method for producing a therapeutic composition comprising purified mRNA that encodes for arylsulfatase B (N-acetylgalactosamine-4-sulfatase) protein. In certain embodiments the present invention provides a method for producing a therapeutic composition comprising purified mRNA that encodes for transcription factor EB (TFEB).

In certain embodiments the present invention provides a method for producing a therapeutic composition comprising purified mRNA that encodes for a protein associated with a glycogen storage disorder. In certain embodiments the present invention provides a method for producing a therapeutic composition comprising purified mRNA that encodes for acid alpha-glucosidase protein. In certain embodiments the present invention provides a method for producing a therapeutic composition comprising purified mRNA that encodes for glucose-6-phosphatase (G6PC) protein. In certain embodiments the present invention provides a method for producing a therapeutic composition comprising purified mRNA that encodes for liver glycogen phosphorylase protein. In certain embodiments the present invention provides a method for producing a therapeutic composition comprising purified mRNA that encodes for muscle phosphoglycerate mutase protein. In certain embodiments the present invention provides a method for producing a therapeutic composition comprising purified mRNA that encodes for glycogen debranching enzyme.

In certain embodiments the present invention provides a method for producing a therapeutic composition comprising purified mRNA that encodes for a protein associated with amino acid metabolism. In certain embodiments the present invention provides a method for producing a therapeutic composition comprising purified mRNA that encodes for phenylalanine hydroxylase enzyme. In certain embodiments the present invention provides a method for producing a therapeutic composition comprising purified mRNA that encodes for glutaryl-CoA dehydrogenase enzyme. In certain embodiments the present invention provides a method for producing a therapeutic composition comprising purified mRNA that encodes for propionyl-CoA caboxylase enzyme. In certain embodiments the present invention provides a method for producing a therapeutic composition comprising purified mRNA that encodes for oxalase alanine-glyoxylate aminotransferase enzyme.

In certain embodiments the present invention provides a method for producing a therapeutic composition comprising purified mRNA that encodes for a protein associated with a lipid metabolism or fibrotic disorder. In certain embodiments the present invention provides a method for producing a therapeutic composition comprising purified mRNA that encodes for an mTOR inhibitor. In certain embodiments the present invention provides a method for producing a therapeutic composition comprising purified mRNA that encodes for ATPase phospholipid transporting 8B1 (ATP8B1) protein. In certain embodiments the present invention provides a method for producing a therapeutic composition comprising purified mRNA that encodes for one or more NF-kappa B inhibitors, such as one or more of I-kappa B alpha, interferon-related development regulator 1 (IFRD1), and Sirtuin 1 (SIRT1). In certain embodiments the present invention provides a method for producing a therapeutic composition comprising purified mRNA that encodes for PPAR-gamma protein or an active variant.

In certain embodiments the present invention provides a method for producing a therapeutic composition comprising purified mRNA that encodes for a protein associated with methylmalonic acidemia. For example, in certain embodiments the present invention provides a method for producing a therapeutic composition comprising purified mRNA that encodes for methylmalonyl CoA mutase protein. In certain embodiments the present invention provides a method for producing a therapeutic composition comprising purified mRNA that encodes for methylmalonyl CoA epimerase protein.

In certain embodiments the present invention provides a method for producing a therapeutic composition comprising purified mRNA for which delivery to or treatment of the liver can provide therapeutic benefit. In certain embodiments the present invention provides a method for producing a therapeutic composition comprising purified mRNA that encodes for ATP7B protein, also known as Wilson disease protein. In certain embodiments the present invention provides a method for producing a therapeutic composition comprising purified mRNA that encodes for porphobilinogen deaminase enzyme. In certain embodiments the present invention provides a method for producing a therapeutic composition comprising purified mRNA that encodes for one or clotting enzymes, such as Factor VIII, Factor IX, Factor VII, and Factor X. In certain embodiments the present invention provides a method for producing a therapeutic composition comprising purified mRNA that encodes for human hemochromatosis (HFE) protein.

In certain embodiments the present invention provides a method for producing a therapeutic composition comprising purified mRNA that encodes a peptide or polypeptide for use in the delivery to or treatment of the cardiovascular disease of a subject or a cardiovascular cell. In certain embodiments, the present invention provides a method for producing a therapeutic composition comprising purified mRNA that encodes for vascular endothelial growth factor A protein. In certain embodiments the present invention provides a method for producing a therapeutic composition comprising purified mRNA that encodes for relaxin protein. In certain embodiments the present invention provides a method for producing a therapeutic composition comprising purified mRNA that encodes for bone morphogenetic protein-9 protein. In certain embodiments the present invention provides a method for producing a therapeutic composition comprising purified mRNA that encodes for bone morphogenetic protein-2 receptor protein.

In certain embodiments the present invention provides a method for producing a therapeutic composition comprising purified mRNA that encodes a peptide or polypeptide for use in the delivery to or treatment of the muscle of a subject or a muscle cell. In certain embodiments the present invention provides a method for producing a therapeutic composition comprising purified mRNA that encodes for dystrophin protein. In certain embodiments the present invention provides a method for producing a therapeutic composition comprising purified mRNA that encodes for frataxin protein. In certain embodiments the present invention provides a method for producing a therapeutic composition comprising purified mRNA that encodes a peptide or polypeptide for use in the delivery to or treatment of the cardiac muscle of a subject or a cardiac muscle cell. In certain embodiments the present invention provides a method for producing a therapeutic composition comprising purified mRNA that encodes for a protein that modulates one or both of a potassium channel and a sodium channel in muscle tissue or in a muscle cell. In certain embodiments the present invention provides a method for producing a therapeutic composition comprising purified mRNA that encodes for a protein that modulates a Kv7.1 channel in muscle tissue or in a muscle cell. In certain embodiments the present invention provides a method for producing a therapeutic composition comprising purified mRNA that encodes for a protein that modulates a Nav1.5 channel in muscle tissue or in a muscle cell.

In certain embodiments the present invention provides a method for producing a therapeutic composition comprising purified mRNA that encodes a peptide or polypeptide for use in the delivery to or treatment of the nervous system of a subject or a nervous system cell. For example, in certain embodiments the present invention provides a method for producing a therapeutic composition comprising purified mRNA that encodes for survival motor neuron 1 protein. For example, in certain embodiments the present invention provides a method for producing a therapeutic composition comprising purified mRNA that encodes for survival motor neuron 2 protein. In certain embodiments the present invention provides a method for producing a therapeutic composition comprising purified mRNA that encodes for frataxin protein. In certain embodiments the present invention provides a method for producing a therapeutic composition comprising purified mRNA that encodes for ATP binding cassette subfamily D member 1 (ABCD1) protein. In certain embodiments the present invention provides a method for producing a therapeutic composition comprising purified mRNA that encodes for CLN3 protein.

In certain embodiments the present invention provides a method for producing a therapeutic composition comprising purified mRNA that encodes a peptide or polypeptide for use in the delivery to or treatment of the blood or bone marrow of a subject or a blood or bone marrow cell. In certain embodiments the present invention provides a method for producing a therapeutic composition comprising purified mRNA that encodes for beta globin protein. In certain embodiments the present invention provides a method for producing a therapeutic composition comprising purified mRNA that encodes for Bruton's tyrosine kinase protein. In certain embodiments the present invention provides a method for producing a therapeutic composition comprising purified mRNA that encodes for one or clotting enzymes, such as Factor VIII, Factor IX, Factor VII, and Factor X.

In certain embodiments the present invention provides a method for producing a therapeutic composition comprising purified mRNA that encodes a peptide or polypeptide for use in the delivery to or treatment of the kidney of a subject or a kidney cell. In certain embodiments the present invention provides a method for producing a therapeutic composition comprising purified mRNA that encodes for collagen type IV alpha 5 chain (COL4A5) protein.

In certain embodiments the present invention provides a method for producing a therapeutic composition comprising purified mRNA that encodes a peptide or polypeptide for use in the delivery to or treatment of the eye of a subject or an eye cell. In certain embodiments, the present invention provides a method for producing a therapeutic composition comprising purified mRNA that encodes for ATP-binding cassette sub-family A member 4 (ABCA4) protein. In certain embodiments the present invention provides a method for producing a therapeutic composition comprising purified mRNA that encodes for retinoschisin protein. In certain embodiments the present invention provides a method for producing a therapeutic composition comprising purified mRNA that encodes for retinal pigment epithelium-specific 65 kDa (RPE65) protein. In certain embodiments the present invention provides a method for producing a therapeutic composition comprising purified mRNA that encodes for centrosomal protein of 290 kDa (CEP290).

In certain embodiments the present invention provides a method for producing a therapeutic composition comprising purified mRNA that encodes a peptide or polypeptide for use in the delivery of or treatment with a vaccine for a subject or a cell of a subject. For example, in certain embodiments the present invention provides a method for producing a therapeutic composition comprising purified mRNA that encodes for an antigen from an infectious agent, such as a virus. In certain embodiments the present invention provides a method for producing a therapeutic composition comprising purified mRNA that encodes for an antigen from influenza virus. In certain embodiments the present invention provides a method for producing a therapeutic composition comprising purified mRNA that encodes for an antigen from respiratory syncytial virus. In certain embodiments the present invention provides a method for producing a therapeutic composition comprising purified mRNA that encodes for an antigen from rabies virus. In certain embodiments the present invention provides a method for producing a therapeutic composition comprising purified mRNA that encodes for an antigen from cytomegalovirus. In certain embodiments the present invention provides a method for producing a therapeutic composition comprising purified mRNA that encodes for an antigen from rotavirus. In certain embodiments the present invention provides a method for producing a therapeutic composition comprising purified mRNA that encodes for an antigen from a hepatitis virus, such as hepatitis A virus, hepatitis B virus, or hepatitis C virus. In certain embodiments the present invention provides a method for producing a therapeutic composition comprising purified mRNA that encodes for an antigen from human papillomavirus. In certain embodiments the present invention provides a method for producing a therapeutic composition comprising purified mRNA that encodes for an antigen from a herpes simplex virus, such as herpes simplex virus 1 or herpes simplex virus 2. In certain embodiments the present invention provides a method for producing a therapeutic composition comprising purified mRNA that encodes for an antigen from a human immunodeficiency virus, such as human immunodeficiency virus type 1 or human immunodeficiency virus type 2. In certain embodiments the present invention provides a method for producing a therapeutic composition comprising purified mRNA that encodes for an antigen from a human metapneumovirus. In certain embodiments the present invention provides a method for producing a therapeutic composition comprising purified mRNA that encodes for an antigen from a human parainfluenza virus, such as human parainfluenza virus type 1, human parainfluenza virus type 2, or human parainfluenza virus type 3. In certain embodiments the present invention provides a method for producing a therapeutic composition comprising purified mRNA that encodes for an antigen from malaria virus. In certain embodiments the present invention provides a method for producing a therapeutic composition comprising purified mRNA that encodes for an antigen from zika virus. In certain embodiments the present invention provides a method for producing a therapeutic composition comprising purified mRNA that encodes for an antigen from chikungunya virus.

In certain embodiments the present invention provides a method for producing a therapeutic composition comprising purified mRNA that encodes for an antigen associated with a cancer of a subject or identified from a cancer cell of a subject. In certain embodiments the present invention provides a method for producing a therapeutic composition comprising purified mRNA that encodes for an antigen determined from a subject's own cancer cell, i.e., to provide a personalized cancer vaccine. In certain embodiments the present invention provides a method for producing a therapeutic composition comprising purified mRNA that encodes for an antigen expressed from a mutant KRAS gene.

In certain embodiments the present invention provides a method for producing a therapeutic composition comprising purified mRNA that encodes for an antibody. In certain embodiments, the antibody can be a bi-specific antibody. In certain embodiments, the antibody can be part of a fusion protein. In certain embodiments the present invention provides a method for producing a therapeutic composition comprising purified mRNA that encodes for an antibody to OX40. In certain embodiments the present invention provides a method for producing a therapeutic composition comprising purified mRNA that encodes for an antibody to VEGF. In certain embodiments the present invention provides a method for producing a therapeutic composition comprising purified mRNA that encodes for an antibody to tissue necrosis factor alpha. In certain embodiments the present invention provides a method for producing a therapeutic composition comprising purified mRNA that encodes for an antibody to CD3. In certain embodiments the present invention provides a method for producing a therapeutic composition comprising purified mRNA that encodes for an antibody to CD19.

In certain embodiments the present invention provides a method for producing a therapeutic composition comprising purified mRNA that encodes for an immunomodulator. In certain embodiments the present invention provides a method for producing a therapeutic composition comprising purified mRNA that encodes for Interleukin 12. In certain embodiments the present invention provides a method for producing a therapeutic composition comprising purified mRNA that encodes for Interleukin 23. In certain embodiments the present invention provides a method for producing a therapeutic composition comprising purified mRNA that encodes for Interleukin 36 gamma. In certain embodiments the present invention provides a method for producing a therapeutic composition comprising purified mRNA that encodes for a constitutively active variant of one or more stimulator of interferon genes (STING) proteins.

In certain embodiments the present invention provides a method for producing a therapeutic composition comprising purified mRNA that encodes for an endonuclease. In certain embodiments the present invention provides a method for producing a therapeutic composition comprising purified mRNA that encodes for an RNA-guided DNA endonuclease protein, such as Cas 9 protein. In certain embodiments the present invention provides a method for producing a therapeutic composition comprising purified mRNA that encodes for a meganuclease protein. In certain embodiments the present invention provides a method for producing a therapeutic composition comprising purified mRNA that encodes for a transcription activator-like effector nuclease protein. In certain embodiments the present invention provides a method for producing a therapeutic composition comprising purified mRNA that encodes for a zinc finger nuclease protein.

In certain embodiments the present invention provides a method for producing a therapeutic composition comprising purified mRNA that encodes for treating an ocular disease. In some embodiments the method is used for producing a therapeutic composition comprising purified mRNA encoding retinoschisin.

Another aspect of the present invention is a purified mRNA composition prepared by an above-described aspect or embodiment.

In some embodiments the present invention provides a pharmaceutical composition including the solution comprising purified mRNA of the above description and at least one pharmaceutically-acceptable excipient.

Typically, a suitable mRNA solution may also contain a buffering agent and/or salt. Generally, buffering agents can include HEPES, ammonium sulfate, sodium bicarbonate, sodium citrate, sodium acetate, potassium phosphate and sodium phosphate.

Pharmaceutically acceptable salts are well known in the art. For example, S. M. Berge et al., describes pharmaceutically acceptable salts in detail in *J. Pharmaceutical Sciences* (1977) 66:1-19. Pharmaceutically acceptable salts of the compounds of this invention include those derived from suitable inorganic and organic acids and bases. Examples of pharmaceutically acceptable, nontoxic acid addition salts are salts of an amino group formed with inorganic acids such as hydrochloric acid, hydrobromic acid, phosphoric acid, sulfuric acid and perchloric acid or with organic acids such as acetic acid, oxalic acid, maleic acid, tartaric acid, citric acid, succinic acid or malonic acid or by using other methods used in the art such as ion exchange. Other pharmaceutically acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, palmoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. Salts derived from appropriate bases include alkali metal, alkaline earth metal, ammonium and $N^+(C_{1-4}\text{ alkyl})_4$ salts. Representative alkali or alkaline earth metal salts include sodium, lithium, potassium, calcium, magnesium, and the like. Further pharmaceutically acceptable salts include, when appropriate, nontoxic ammonium, quaternary ammonium, and amine cations formed using counterions such as halide, hydroxide, carboxylate, sulfate, phosphate, nitrate, sulfonate and aryl sulfonate. Further pharmaceutically acceptable salts include salts formed from the quarternization of an amine using an appropriate electrophile, e.g., an alkyl halide, to form a quarternized alkylated amino salt.

An aspect of the present invention is a method for treating a disease or disorder including a step of administering to a subject in need thereof the pharmaceutical composition of the above aspect.

Another aspect of the present invention is a solution including purified mRNA prepared by an above-described aspect or embodiment.

Any aspect or embodiment described herein can be combined with any other aspect or embodiment as disclosed herein. While the disclosure has been described in conjunction with the detailed description thereof, the above description is intended to illustrate and not limit the scope of the disclosure, which is defined by the scope of the appended claims. Other aspects, advantages, and modifications are within the scope of the following claims.

Additional teaching relevant to the present invention are described in one or more of the following: WO 2010/053572; WO 2011/068810; WO 2012/075040; WO 2012/170889; WO 2012/170930; WO 2013/063468; WO 2013/149140; WO 2013/149141; WO 2013/185067; WO 2013/185069; WO 2014/089486; WO 2014/152513; WO 2014/152659; WO 2014/152673; WO 2014/152774; WO 2014/152966; WO 2014/153052; WO 2015/061461; WO 2015/061467; WO 2015/061491; WO 2015/061500; WO 2015/148247; WO 2015/164773; WO 2015/184256; WO 2015/200465; WO 2016/004318; WO 2016/149508; WO/2014/152940; PCT/US16/57044; U.S. 62/320,073; U.S. 62/349,331; U.S. 62/420,413; U.S. 62/420,421; U.S. 62/420,428; U.S. 62/420,435; U.S. 62/421,007; U.S. 62/421,021, each of which is hereby incorporated by reference in its entirety.

Although methods and materials similar or equivalent to those described herein can be used in the practice or testing of the present invention, suitable methods and materials are described below. All publications, patent applications, patents, and other references mentioned herein are incorporated by reference in their entirety. The references cited herein are not admitted to be prior art to the claimed invention. In addition, the materials, methods, and examples are illustrative only and are not intended to be limiting.

EXAMPLES

Example 1. Improved mRNA Purification Using 5 M GSCN Precipitation Buffer

In this example, 5 M GSCN precipitation buffers were compared to a buffer having 4 M GSCN for their ability to remove process enzymes at a milligram scale using a column filtration format. The purification product, obtained after a single precipitation step followed by filtering, is desired to have reduced or undetectable protein contaminants, as determined by silver staining gel analysis.

Materials and Methods

CFTR mRNA was prepared by in vitro transcription as described elsewhere. Briefly, an exemplary IVT reaction was performed with a linear or circular DNA template comprising a codon optimized CFTR sequence, the template DNA also containing a promoter, a pool of ribonucleotide triphosphates, a buffer system including DTT and magnesium ions, and an appropriate RNA polymerase (e.g., T3, T7, or SP6 RNA polymerase), DNAse I, pyrophosphatase, and/or RNAse inhibitor.

Reactions involving incorporation of 5'-cap and 3' poly A tail (cap-tail reactions) were performed immediately before purification. A 5' cap was added as follows: first adding a terminal phosphatase to the reaction, where the RNA terminal phosphatase removes one of the terminal phosphate groups from the 5' nucleotide, leaving two terminal phosphates; guanosine triphosphate (GTP) was then added to the terminal phosphates via a guanylyl transferase, producing a 5'-5' triphosphate linkage; and the 7-nitrogen of guanine was then methylated by a methyltransferase. The construct was treated further to incorporate a poly (A) tail using poly (A) polymerase. The reaction mix comprising the mRNA was then subjected to precipitation and subsequent steps as described below. Table 1 summarizes the materials used in the method steps described in this example.

TABLE 1

| Name | Description |
| --- | --- |
| mRNA | CFTR mRNA C/T Reaction (2.5 mg scale) |
| Filter | Qiagen Maxi-Prep Colum |
| Ethanol | 100% Ethanol |
| 80% Ethanol | 80% Ethanol, 20% water (v/v) |
| 4M GSCN Buffer | 4M Guanidine Thiocyanate, 25 mM Sodium Citrate, 0.5% N-Lauryl Sarcosine |
| 5M GSCN Buffer | 5M Guanidine Thiocyanate, 25 mM Sodium Citrate, 1% N-Lauryl Sarcosine or 0.1% N-Lauryl Sarcosine |

Precipitation: 2.5 mg CFTR mRNA cap-tail reactions were precipitated using one of the above listed precipitation buffers (4 M GSCN control, 5 M GSCN 1% or 5 M GSCN 0.1% N-Lauryl Sarcosine) under the following conditions: One volume of mRNA reaction was mixed with 2.3 volumes of precipitation buffer and mixed thoroughly. For every one volume of initial cap tail reaction, 1.7 volumes of 100% EtOH was added to the RNA:precipitation buffer and mixed thoroughly to precipitate.

Filtration: The precipitated mixture was loaded onto a maxiprep filtration column (Qiagen, Germantown, MD) and centrifuged to capture the precipitated mRNA onto the Qiagen filter (all centrifugations were performed at 3,600 RPM). The captured mRNA precipitate was then washed 2× with 80% EtOH (1 mL 80% EtOH/mg of RNA per wash) with a 2 min centrifugation following the first wash and a 10 min centrifugation following the second wash. Elutions were performed by adding water to the membrane followed by incubations at room temperature and centrifugation. This process was repeated for a total of 5 times with a total elution volume of 2.0 mL. Absorbance at 260 nM was measured and concentrations for each sample were determined.

Silver Stain: Silver staining gels were run using the method described in the preceding example. 15.5 µl of 1 mg/ml purified RNA treated with 4 µl of RNaseI (100/mL, Invitrogen) for 30 mins at 37° C. Samples were prepared in Invitrogen LDS loading buffer with reducing reagent and loaded on 10% Bis-Tris gels. Electrophoresis was carried out at 200 V for 35 mins. Gels stained using the SilverQuest staining kit for 8 mins.

Results

Following the single purification cycle of CFTR mRNA cap tail reactions as described above, yields for each sample were calculated using a Nano-Drop to determine concentration (A260 nm) and summarized in the Table 2 (below). mRNA Yield=elution concentration (mg/mL)*elution volume (mL). Yields from all conditions were acceptable and within the range of the desired yields based on reaction scale.

TABLE 2

| Sample | Yield (mg) | % Rec |
| --- | --- | --- |
| Purified CFTR mRNA Control | 2.6 | 104 |
| Purified CFTR mRNA with GSCN Precipitation Buffer-1% N-lauryl sarcocine | 2.2 | 88 |
| Purified CFTR mRNA with GSCN-Precipitation Buffer-0.1% N-lauryl sarcosine | 2.1 | 85 |

Samples were analyzed in the silver staining gel assay to detect residual process enzymes. The silver stained gel images are presented in FIG. 1. A significant improvement in process enzyme removal was noticed for samples precipitated using 5 M GSCN-1% lauryl sarcosine buffer (FIG. 1, lane 6 of Gel 2), or 5 M GSCN-0.1% lauryl sarcosine buffer (FIG. 1, lanes 8 of Gel 2), when compared to the samples precipitated using 4 M GSCN buffer (FIG. 1, lane 5 of Gel 1). These data indicate that increasing the GSCN molar concentration improved process enzyme removal, regardless of the concentration of the surfactant in the buffer.

Example 2. Improved mRNA Purification Using 5 M GSCN Precipitation Buffer Containing DTT In this example, precipitation buffers with and without dithiothreitol (DTT) were compared for their ability to remove residual enzymes associated with mRNA preparation/manufacturing process (i.e., process enzymes) and to reduce the number of precipitations necessary to ensure adequate removal of the same. mRNA purification was performed in a milligram scale by filtration using a multi-well microplate format.

Materials and Methods

CFTR mRNA was prepared by in vitro transcription as described above. mRNA cap-tail reactions were subjected to purification using the method described below. Table 3 summarizes the materials used in the method steps described in this example.

TABLE 3

| Name | Description |
| --- | --- |
| mRNA | mRNA C/T Reaction (2.0 mg scale) |
| Filter | 24-Well Whatman GS-F Filter Plate |
| Ethanol | 100% Ethanol |
| 80% Ethanol | 80% Ethanol, 20% water (v/v) |
| 5M GSCN Buffer | 5M Guanidine Thiocyanate, 25 mM Sodium Citrate, 0.5% N-Lauryl Sarcosine |
| 5M GSCN w/DTT Buffer | 5M Guanidine Thiocyanate, 25 mM Sodium Citrate, 0.5% N-Lauryl Sarcosine, 10 mM DTT |

Precipitation: For each well of a 24-well plate, 2.0 mg mRNA cap-tail (C/T) reactions were precipitated using one of the above listed precipitation buffers (5 M GSCN or 5 M GSCN with 10 mM DTT) under the following conditions: One volume of mRNA reaction was added to 2.3 volumes of precipitation buffer and mixed thoroughly. For every one volume of initial cap-tail reaction, 1.7 volumes of 100% EtOH was added to the RNA:precipitation buffer and mixed thoroughly to precipitate.

Filtration: The precipitated mixture was loaded into individual wells of a 24-well filter plate and vacuum pressure of ~5 PSI was applied to the plate to capture the precipitated mRNA. The captured mRNA precipitate was then washed 2× with 80% EtOH (1 mL 80% EtOH/mg of RNA per wash) with a 5 PSI vacuum filtration following the first and second washes. Elutions were performed by adding water to the membrane followed by incubations at room temperature and vacuum filtration. This process was repeated for a total of 5× with a total elution volume of 2.0 mL per well. Absorbance at 260 nM was measured and concentrations for each sample were determined.

Silver Stain: Silver staining gels were run using an Invitrogen kit (Invitrogen, Carlsbad, CA) according to the manufacturer's instructions with the following pre-stain sample preparations. 15.5 μl of 1 mg/ml purified RNA treated with 4 μl of RNaseI (100 U/mL, Invitrogen) for 30 mins at 37° C. Samples were prepared in Invitrogen LDS loading buffer with reducing reagent and loaded on 10% Bis-Tris gels. Electrophoresis was carried out at 200 V for 35 mins. Gels were stained using the SilverQuest Silver Staining kit (Invitrogen, Carlsbad, CA), for 8 mins.

Results

Following the single purification of CFTR mRNA cap-tail reactions as described above, total yield for each sample was calculated after measuring the optical density of the mRNA elution using a Nano-Drop spectrophotometer (Nano Drop Technologies, Wilmington, DE) to determine mRNA concentration (A260 nm). mRNA Yield=elution concentration (mg/mL)*elution volume (mL). The results are summarized in Table 4 below. Table 4 indicates desired yield from the DTT buffer-based protocol for the reaction scale.

TABLE 4

| Sample | Yield (mg) | % Rec |
| --- | --- | --- |
| Purified CFTR mRNA 5M GSCN | 1.7 | 85 |
| Purified CFTR mRNA 5M GSCN w/DTT | 1.7 | 85 |

Figure 2:
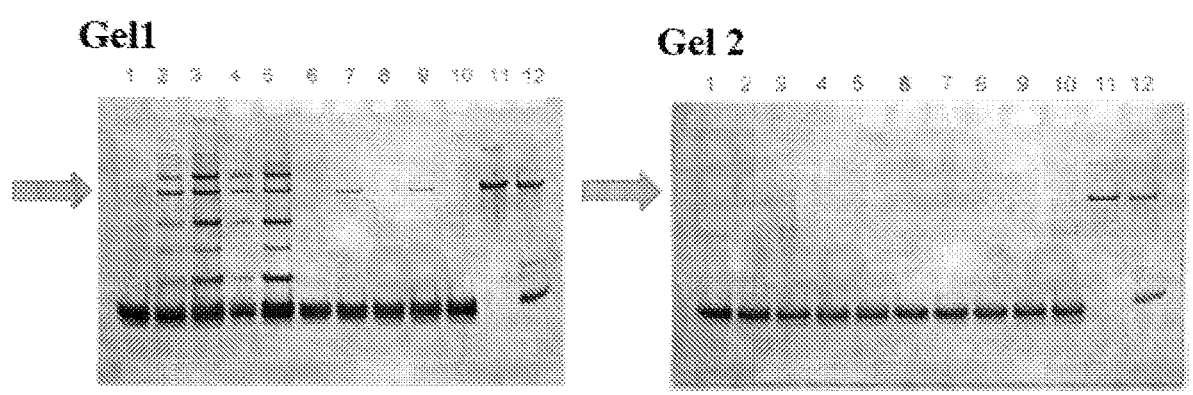
FIG. 2 depicts silver staining gel analysis of purified, RNase 1 digested mRNA products for detection of residual protein in mRNA preparation. CFTR mRNA was purified by filtration in 24 well microtiter plate using Guanidine Thiocyanate Buffers. Lane 1 of either Gel 1 (left image) or Gel 2 (right image) represents a positive control mRNA showing faint bands of contaminant proteins. Gel 1, lane 6 depicts sample purified using 5M Guanidine Thiocyanate Buffer without DTT; Gel 2, lane 6 depicts sample purified using 5M Guanidine Thiocyanate Buffer with DTT; lanes 10-12 of either gel depict electrophoretic migration controls for RNase 1, SP6 and Guanylate Transferase respectively. Other lanes not identified herein are not applicable (n/a) to the context. Arrows indicate migration of a major contaminant band, SP6 polymerase/Guanylate Transferase.

Samples were analyzed in silver staining assay to detect residual process enzymes as described in the preceding paragraph). The silver stained gel images are presented in FIG. 2. Lane 6 of Gel 1 (FIG. 2, left image) represents sample purified using 5 M GSCN without DTT. Lane 6 of Gel 2 (FIG. 2, right image) represents sample purified using 5 M GSCN with 10 mM DTT. A significant improvement was noticed in the removal of process enzymes for samples precipitated using the 5 M GSCN with 10 mM DTT buffer when compared to 5 M GSCN alone (Gel 2 lane 6 compared to Gel 1 lane 6). Lane 1 in Gel 1 or Gel 2 show a control sample which show faint bands of contaminant enzymes. Lanes 10-12 in each gel show electrophoretic migration control of process enzymes, RNaseI (lane 10), SP6 (lane 11), guanylate transferase (lane 12) respectively.

Example 3. Purification of 1 Gram of Capped and Tailed mRNA Using GSCN-DTT Precipitation Buffer In this example, the ability of the GSCN-DTT buffer to successfully remove detectable levels of contaminant residual enzymes from an mRNA manufacturing process at a gram-scale was evaluated.

Materials and Methods mRNA was processed in a 1 gram batch purification scale. CFTR mRNA was synthesized using previously described in vitro transcription method. Capping and tailing reactions were performed immediately prior to purification. Table 5 summarizes the materials used in the process described in this example.

TABLE 5

| Name | Description |
| --- | --- |
| mRNA | CFTR mRNA C/T Reaction (1 G scale) |
| Filter | 1L 0.22 um PES Filter Flask |
| Filter Aid | Solka-Floc-100 |
| Ethanol | 100% Ethanol |
| 80% Ethanol | 80% Ethanol, 20% water (v/v) |
| 5M GSCN w/DTT Buffer | 5M Guanidine Thiocyanate, 25 mM Sodium Citrate, 0.5% N-Lauryl Sarcosine, 10 mM DTT |

Precipitation: A 1 gram (1 g) CFTR mRNA capping and tailing reaction (cap-tail reaction) was precipitated using 5 M GSCN with DTT under the following conditions. One volume of mRNA reaction was added to 2.3 volumes of precipitation buffer and mixed thoroughly. For one volume of initial cap-tail reaction, 1.7 volumes of 100% EtOH was added to the mRNA:precipitation buffer solution and mixed thoroughly to precipitate. Following precipitation, 10 g of Solka-Floc 100 was added to act as a filtering agent (filter aid) to prevent membrane fouling and aid in final elution.

Filtration: The precipitated mixture with filtering agent was loaded onto a 1 L vacuum filtration flask and vacuum was applied to filter the precipitate out of the precipitation buffer. The captured mRNA precipitate was then washed with 80% EtOH (1 L 80% EtOH/g of RNA) followed by a 10 min vacuum dry step. Elutions were performed by removing the precipitated mRNA and filter aid and suspending in 250 mL of water. The suspension was agitated for 30 min at room temperature then passed through a fresh 0.22 µm PES filter flask to remove the filter aid. Absorbance at 260 nm was measured and concentrations for each sample were determined.

Silver Stain: Silver stain gels were run according to the Invitrogen kit with the following pre-stain sample preparations. 15.5 µl of 1 mg/ml RNA treated with 4 µl of RNaseI (100 U/mL, Invitrogen) for 30 mins at 37° C. Samples were prepared in Invitrogen LDS loading buffer with reducing reagent and ultimately loaded on 10% Bis-Tris gels. Electrophoresis was carried out at 200 V for 35 mins. Gels were stained using the Silver Quest staining kit and developed for 8 mins.

Results:

Following a single round of purification of CFTR mRNA cap tail reaction as described above, sample yield was calculated using a Nano-Drop to determine concentration (A260 nm) and summarized in Table 6 (below). The mRNA yield from the 1 g reaction was acceptable and within the range of the desired yield based on reaction scale.

TABLE 6

| Sample | Yield (g) | % Rec |
|---|---|---|
| 1 G Filter Flask Purified CFTR mRNA | 1.1 | 110 |

Figure 3:
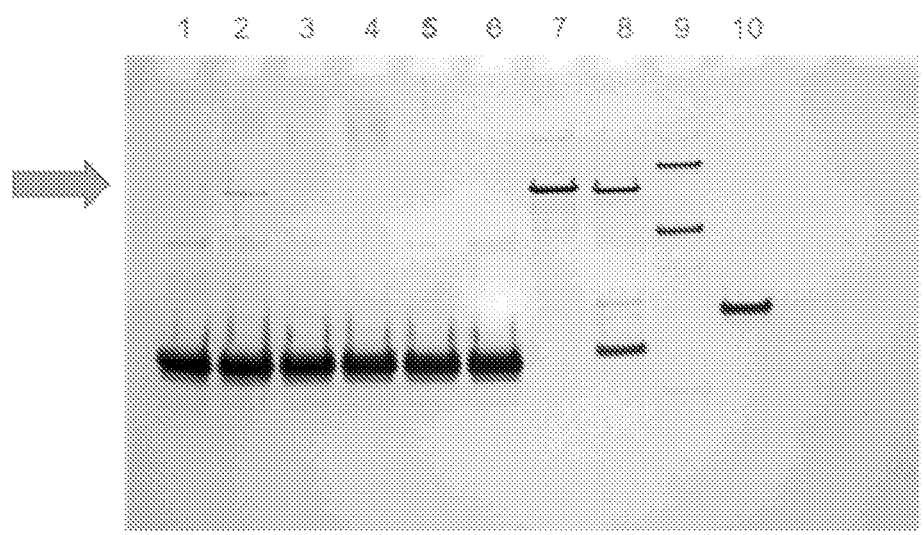
FIG. 3 depicts silver staining gel analysis of gram-scale purified, RNase 1 digested products for detection of residual protein in mRNA preparation. Lane 1 depicts faint positive control sample. Lane 5 depicts the sample from purification of 1 g CFTR mRNA preparation using 5M GSCN w/DTT buffer. Lanes 6-10 depict electrophoretic migration controls for RNase1, SP6, Guanylate Transferase, Poly A Polymerase and O-methyl Transferase respectively. Other lanes not identified herein are not applicable (n/a) to the context. Arrow indicates position for migration of a major contaminant band, SP6 polymerase/Guanylate Transferase.

Samples were analyzed in silver stain gels to detect presence of any residual enzymes from the process. The silver stain gel image is presented below in FIG. 3. No observable residual enzymes were detectable in the purified CFTR mRNA sample (FIG. 3, lane 5). Electrophoretic migration controls for process enzymes are depicted in the gel as follows: RNAsel (lane 6), SP6 (lane 7), guanylate transferase (lane 8), poly A polymerase (lane 9) and 2-O-Methyl Transferase (lane 10). These results demonstrate that gram-scale cap-tail mRNA was successfully precipitated, captured, washed and recovered using a 1 L 0.22 µm vacuum filter flask with filter aid and 5M GSCN-10 mM DTT. Surprisingly, a single purification step was capable of removing any detectable levels of residual process enzymes based on the sensitivity of our detection methods.

Example 4. Purification of 10 Grams of Capped and Tailed mRNA Using GSCN-DTT Precipitation Buffer In this example, the ability of the GSCN-DTT buffer to successfully remove detectable levels of contaminant residual enzymes from the mRNA processed in a 10 gram batch purification scale, and involves a single precipitation step.

Materials and Methods:

CFTR mRNA was synthesized using previously described in vitro transcription method. Capping and tailing reactions were performed immediately prior to purification. Table 7 summarizes the materials used in the process described below.

TABLE 7

| Name | Description |
|---|---|
| mRNA | CFTR mRNA C/T Reaction (1 G scale) |
| Filter | H300P Filtering Centrifuge with 1 um PolyPro Filter Cloth |
| Filter Aid | Solka-Floc-100 |
| Ethanol | 100% Ethanol |
| 80% Ethanol | 80% Ethanol, 20% water (v/v) |
| 5M GSCN w/ DTT Buffer | 5M Guanidine Thiocyanate, 25 mM Sodium Citrate, 0.5% N-Lauryl Sarcosine, 10 mM DTT |

Precipitation: A 10 gram (10 g) CFTR mRNA capping and tailing reaction (cap-tail reaction) was precipitated using 5M GSCN w/DTT under the following conditions. One volume of mRNA reaction was added to 2.3 volumes of precipitation buffer and mixed thoroughly. For one volume of initial cap-tail reaction, 1.7 volumes of 100% EtOH was added to the RNA:precipitation buffer solution and mixed thoroughly to precipitate. Following precipitation, 20 g of Solka-Floc 100 were added to act as a filtering agent to prevent membrane fouling and aid in final elution.

Filtration: The precipitated mixture with filtering agent was loaded onto a H300P filtering centrifuge (Heinkel USA, Swedesboro, NJ) at 2.0 L/min at 1500 RPM. The captured RNA precipitate was then washed with 80% EtOH (5 L 80% EtOH/g of RNA) followed by a 15 min drying step. Elution were performed by removing the precipitated mRNA and filter aid and suspending in 5 L of water. The suspension was agitated for 30 min at room temperature then passed through the H300P filtering centrifuge to remove the filter aid. Two additional 5 L elutions were performed to recover as much material from the filter aid cake as possible. Absorbance at 260 nm was measured and concentrations for each sample were determined.

Silver Stain: Silver staining agarose gels were run according to the Invitrogen kit with the following pre-stain sample preparations. 15.5 µl of 1 mg/ml RNA treated with 4 µl of RNaseI (100 U/mL, Invitrogen) for 30 mins at 37° C. Samples were prepared in Invitrogen LDS loading buffer with reducing reagent and ultimately loaded on 10% Bis-Tris gels. Electrophoresis was carried out at 200 V for 35 mins. Gels were stained using the SilverQuest staining kit and developed for 8 mins.

Capillary electrophoresis (CE): RNA integrity and tail length were assessed using a CE fragment analyzer and the large RNA detection kit. Analysis of peak profile for integrity and size shift for tail length were performed.

Results:

Following a single purification of CFTR mRNA cap tail reaction as described above, sample yield was calculated using a Nano-Drop to determine concentration (A260 nm) and summarized in Table 8 below. The final mRNA yield from the 10 G reaction was good and within the range of the desired yield based on reaction scale.

TABLE 8

| Sample | Yield (g) | % Rec |
|---|---|---|
| 10 G H300P Purified CFTR mRNA | 9.1 | 91 |

Figure 4:
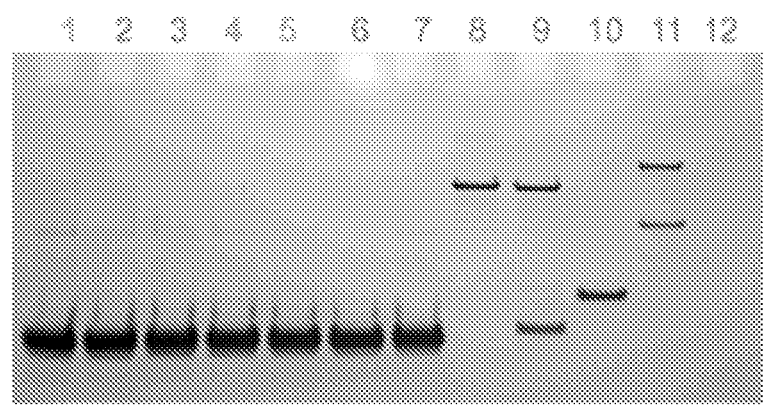
FIG. 4 depicts silver staining gel analysis of 10 gram (10 g)-scale purified, RNase 1 digested products for detection of residual protein in mRNA preparation. Lane 5 depicts the sample from purification of 10 g CFTR mRNA preparation using 5M GSCN w/DTT Buffer. Lanes 7-11 depict electrophoretic migration controls for RNase 1, SP6, Guanylate Transferase, Poly A Polymerase and O-methyl Transferase respectively. Arrow indicates position for migration of a major contaminant band, SP6 polymerase/Guanylate Transferase. Other lanes not identified herein are not applicable (n/a) to the context.

Samples were analyzed in silver stain gel assay to detect residual process enzymes. The silver stain gel image is shown in FIG. 4, depicting no observable residual process enzymes in the purified CFTR mRNA sample (lane 4). Lane 1 shows a control purified mRNA sample showing faint bands of contaminant enzymes. Lanes 7-11 depict electrophoretic migration controls for process enzymes as follows: RNAseI (lane 7), SP6 (lane 8), guanylate transferase (lane 9), poly A polymerase (lane 10) and 2-O-Methyl Transferase (lane 11).

RNA integrity and tail length following a single purification using the H300P and 5 M GSCN w/10 mM DTT were assessed by CE. The integrity of the mRNA after single purification is demonstrated in FIG. 5A and FIG. 5B. FIG. 5A shows mRNA peak before tailing reaction. FIG. 5B shows mRNA peak after tailing reaction of the same original mRNA preparation. A single distinct peak on the CE electropherogram in FIG. 5B is consistent with historical control samples (not shown). A poly-A tail length of 534 nt was assessed based on CE gel shift as compared to the untailed RNA (FIG. 5B versus FIG. 5A). The tail length was within the predicted tail size based on tailing reaction conditions.

The example shows that 10 g of mRNA was successfully precipitated, captured, washed and recovered using a H300P centrifuge with 5 M GSCN-10 mM DTT as precipitation buffer. A single purification process using 5 M GSCN-10 mM DTT can remove any detectable levels of residual process enzymes based on the sensitivity of our detection method. Filter centrifugation with 5 M GSCN-10 mM DTT had no negative impacts on mRNA integrity or tail when compared to historical samples.

Example 5. Purification of 100 Grams of Capped and Tailed mRNA Using GSCN-DTT Precipitation Buffer In this example, the ability of the GSCN-DTT buffer to successfully remove detectable levels of contaminant residual enzymes from the mRNA processed in a 100 gram (100 g) batch purification scale, and involves a single precipitation step.

Materials and Methods:

CFTR mRNA was synthesized using previously described in vitro transcription method. Capping and tailing reactions were performed immediately prior to purification. Table 9 summarizes the materials used in the process described below.

TABLE 9

| Name | Description |
|---|---|
| mRNA | CFTR mRNA C/T Reaction (1 G scale) |
| Filter | EHBL503 Filtering Centrifuge with 1 um PolyPro Filter Cloth |
| Filter Aid | Solka-Floc-100 |
| Ethanol | 100% Ethanol |
| 80% Ethanol | 80% Ethanol, 20% water (v/v) |
| 5M GSCN w/DTT Buffer | 5M Guanidine Thiocyanate, 25 mM Sodium Citrate, 0.5% N-Lauryl Sarcosine, 10 mM DTT |

Precipitation: 100 g CFTR mRNA cap-tail reaction was precipitated using 5 M GSCN with DTT under the following conditions. One volume of mRNA reaction was added to 2.3 volumes of precipitation buffer and mixed thoroughly. For one volume of initial cap-tail reaction, 1.7 volumes of 100% EtOH was added to the RNA:precipitation buffer solution and mixed thoroughly to precipitate. Following precipitation, 1200 g of Solka-Floc 100 were added to act as a filtering agent to prevent membrane fouling and aid in final elution.

Filtration: The precipitated mixture with filter agent was loaded onto an EHBL503 filtering centrifuge (Rousselet Robatel, Annonay, FR) at 6.0 L/min at 1000 RPM. The captured RNA precipitate was then washed with 80% EtOH (1.5 L 80% EtOH/g of RNA) followed by a 20 min drying step. Elutions were performed by removing the precipitated mRNA and filter aid and suspending in 25 L of water. The suspension was agitated for 30 min at room temperature then passed through the EHBL503 filtering centrifuge to remove the filter aid. Two additional 15 L elutions were performed to recover as much material from the filter aid cake as possible. Absorbance at 260 nm was measured and concentrations for each sample were determined.

Silver stain: Silver stain gels were run according to the Invitrogen kit with the following pre-stain sample preparations. 15.5 µl of 1 mg/ml RNA treated with 4 µl of RNaseI (100 U/mL, Invitrogen) for 30 mins at 37° C. Samples were prepared in Invitrogen LDS loading buffer with reducing reagent and ultimately loaded on 10% Bis-Tris gels. Electrophoresis was carried out at 200 V for 35 mins. Gels were stained using the SilverQuest staining kit and developed for 8 mins.

CE: RNA integrity and tail length were assessed using a CE fragment analyzer and the large RNA detection kit. Analysis of peak profile for integrity and size shift for tail length were performed.

Cap Assay: Cap species present in the final purified mRNA product were determined using HPLC/MS method, capable of accurately calculating Uncapped, CapG, Cap0 and Cap1 amounts and is reported as a percentage of total signal.

Results:

Following a single purification of CFTR mRNA cap tail reaction as described above, sample yield was calculated using a Nano-Drop to determine concentration (A260 nm) and summarized in Table 10 below. The final mRNA yield from the 100 g reaction was within the range of the desired yield based on reaction scale.

TABLE 10

| Sample | Yield (g) | % Rec |
|---|---|---|
| 100 G Centrifuge Purified CFTR mRNA | 102 | 102 |

Figure 6:
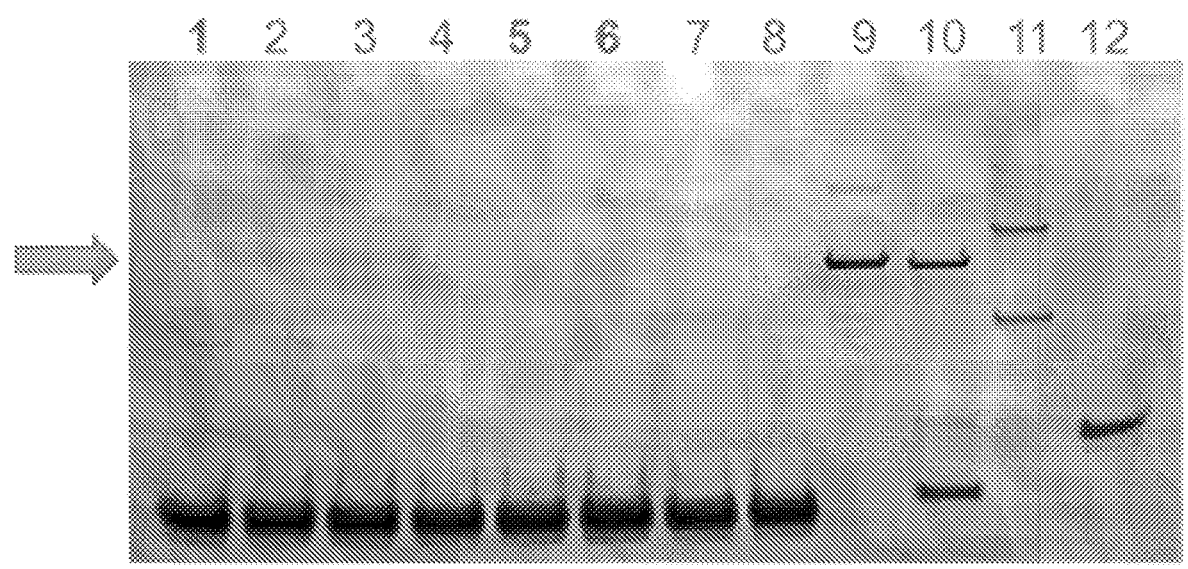
FIG. 6 depicts silver staining gel analysis of 100 gram (100 g)-scale purified, RNase 1 digested products for detection of residual protein in the mRNA preparation. Lanes 5 and 6 depict the purified product. Lane 1 depicts a control purified mRNA sample showing faint bands of contaminant enzymes. Lanes 8-12 depict electrophoretic migration controls for process enzymes RNAseI, SP6, Guanylate Transferase, Poly A Polymerase and 2-O-Methyl Transferase respectively.

Silver stain gel image is shown in FIG. 6, which indicate that no observable residual process enzymes in the purified CFTR mRNA sample (lanes 5 and 6). This was surprising that a single purification step with the buffer of the invention could result in highly pure mRNA with no detectable contaminant process enzymes(s). In this figure, lanes 8-12 depict electrophoretic migration controls for process enzymes as follows lanes RNAseI (lane 8), SP6 (lane 9), guanylate transferase (lane 10), poly A polymerase (lane 11) and 2-O-Methyl Transferase (lane 12).

Figure 7:
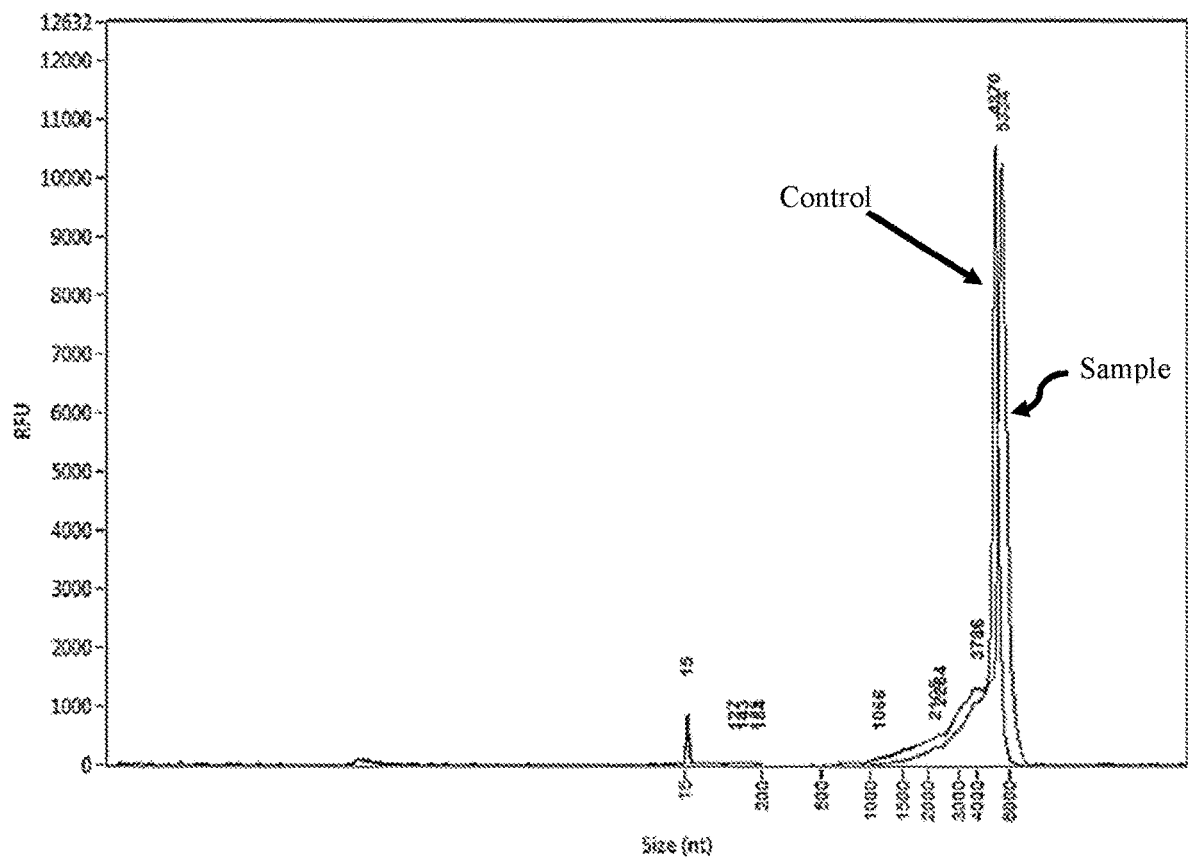
FIG. 7 depict capillary electrophoresis of 100 g-scale purified mRNA samples. The peak depicted by curved arrow indicates mRNA purified by the method of the invention. The peak depicted by straight arrow indicates control sample processed using 4M GSCN buffer.

CE electropherogram of the RNA demonstrate a single distinct peak that is consistent with a representative historical control sample (FIG. 7, indicated by arrows). A poly-A tail length of 300 nt was assessed based on CE gel shift in the C/T mRNA (FIG. 7) as compared to the uncapped RNA (data not shown). The tail length was within the predicted tail size based on tailing reaction conditions.

The percent of Cap1 species in the final mRNA product following a single purification using 5 M GSCN w/10 mM DTT was (95%). The remaining species were all uncapped (5%). These results were consistent with historical Cap1% for this transcript (data not shown).

These data indicate that 100 g of mRNA was successfully precipitated, captured, washed and recovered using an EHBL503 centrifuge with 5 M GSCN-10 mm DTT as precipitation buffer. A single purification process using 5 M GSCN-10 mM DTT can remove any detectable levels of residual process enzymes based on the sensitivity of our detection method. Use of the filtering centrifuge with 5 M GSCN-10 mM DTT had no negative impacts on mRNA integrity, tail length, mRNA capping efficiency or stability when compared to historical samples.

Example 6. Purification of Capped and Tailed mRNA Using Various Reducing Agents In this example, different reducing reagents were assessed for their ability to remove process enzymes when added to a 5M GSCN precipitation buffer.

Materials and Methods:

Eight batches of 5 mg CFTR mRNA were synthesized using previously described in vitro transcription method. For precipitation, 2.3 volumes of 5M GSCN buffer (2.3M GSCN final) with various reducing agents listed in Table 11 were added per one volume of IVT reaction. Then, 1.7 volumes of 100% EtOH (34% EtOH final) was added to the mix. The precipitated RNA samples were captured on Qiagen RNeasy maxi columns, washed twice with 10 mL of 80% ethanol, then dissolved in 2 mL of RNase-free H$_2$O. The concentration of the dissolved RNA samples was calculated using absorbance at 260 nm using a Nano-Drop 2000. Spectrophotometer.

TABLE 11

| Buffer # | Buffer | Reducing Agent |
| --- | --- | --- |
| A | 5M GSCN | — |
| B | 5M GSCN | 10 mM DTT |
| C | 5M GSCN | 5 mM THPP |
| D | 5M GSCN | 10 mM THPP |
| E | 5M GSCN | 15 mM THPP |
| F | 5M GSCN | 5 mM TCEP |
| G | 5M GSCN | 10 mM TCEP |
| H | 5M GSCN | 15 mM TCEP |

The resulting CFTR IVT mRNA samples were then used as the starting material for eight 5 mg cap and tail reactions. Following capping and tailing, each of the eight reactions were precipitated by adding 2.3 volumes of 5M GSCN buffer (2.3M GSCN final) listed in Table 11 per one volume of IVT reaction. Then, 1.7 volumes of 100% EtOH (34% EtOH final) were added to the mix. The precipitated RNA samples were captured on Qiagen RNeasy maxi columns, washed twice with 10 mL of 80% ethanol then dissolved in 5 mL of RNase-free H2O. The concentration of the dissolved RNA samples was calculated using absorbance at 260 nm using a Nano-Drop 2000. Spectrophotometer.

Each sample was evaluated using the silver stain method as described in Example 1 to determine the amount of residual process enzymes present following purification with the various reducing reagents.

Figure 8:
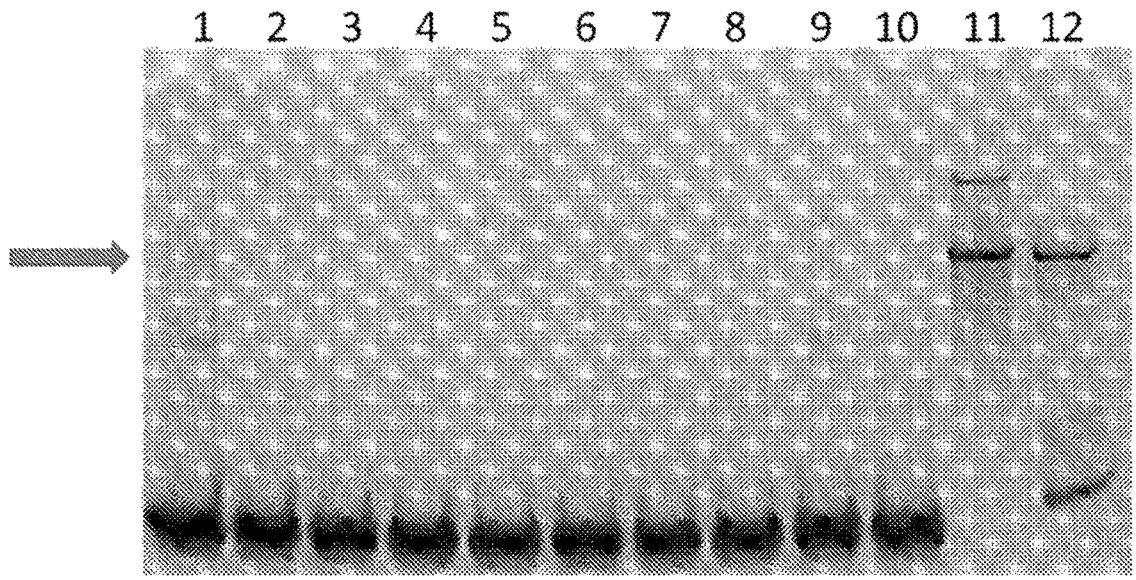
FIG. 8 depicts silver staining gel analysis mRNA products purified with various reducing agents. Lane 2 depicts the purified the product using 5M GSCN only, without a reducing agent. Lanes 3-9 depict the purified product using 5M GSCN with various reducing agents at different concentrations. Lanes 10-12 depict electrophoretic migration controls for process enzymes RNase I, SP6 and Guanylate Transferase respectively.

Results:

As shown in FIG. 8, the use of any of the reducing agents tested at concentrations from 5 to 15 mM in 5M GSCN precipitation buffer all resulted in complete removal of detectable levels of RNA process enzymes (lanes 3-9). The CFTR reactions purified using 5M GSCN only (lane 2), without any reducing agent, had a faint and observed in the molecular weight range of RNA polymerase and GuaT, providing further evidence that GSCN alone is inefficient at removing RNA synthesis process enzymes.

These results confirm that the addition of a reducing agent in the RNA precipitation buffer when using GSCN as the chaotropic salt is necessary to ensure adequate process enzyme removal. Interestingly, multiple reducing reagents at varying concentrations perform similarly to the original assessed DTT reagent at 10 mM. Without wishing to be bound by theory, reduction of RNA process enzymes prior to addition of an organic solvent to precipitate RNA is an important step as this reduction step facilitates removal of the process enzyme when purifying RNA using ethanol salt induced precipitation.

EQUIVALENTS

Those skilled in the art will recognize, or be able to ascertain using no more than routine experimentation, many equivalents to the specific embodiments of the invention described herein.

We claim:

1. A method for removing impurities from a messenger RNA (mRNA) preparation synthesized by large scale in vitro transcription (IVT) process, the method comprising:
    providing a solution comprising the IVT-synthesized mRNA;
    precipitating the IVT-synthesized mRNA from the solution using a denaturing buffer comprising a denaturing salt in combination with a reducing agent, and an alcohol, wherein the reducing agent is present at a final concentration of 5-50 mM;
    capturing the precipitated mRNA; and
    dissolving the captured mRNA into a solution, thereby purifying the mRNA.

2. The method of claim 1, further comprising the steps of capping and tailing the mRNA before precipitating the mRNA.

3. The method of claim 1, wherein the purified mRNA obtained by the method is greater than at least 90% of the amount of mRNA synthesized.

4. The method of claim 1, wherein at least about 1 mg mRNA is synthesized in the IVT reaction.

5. The method of claim 1, wherein at least about 10 g mRNA is synthesized in the IVT reaction.

6. The method of claim 1, wherein the precipitating step comprises adding together the solution comprising the IVT-synthesized mRNA, the denaturing buffer comprising the denaturing salt in combination with the reducing agent, and the alcohol at a volumetric ratio of:
    (a) 1:(5):(3); or
    (b) 1:(3.5):(2.1); or
    (c) 1:(2.8):(1.9); or
    (d) 1:(2.3):(1.7); or
    (e) 1:(2.1):(1.5).

7. The method of claim 1, wherein the denaturing salt is guanidinium thiocyanate.

8. The method of claim 7, wherein guanidinium thiocyanate is present in a final concentration of greater than at least 4M.

9. The method of claim 1, wherein the reducing agent is dithiothreitol (DTT).

10. The method of claim 1, wherein the step of precipitating the mRNA is performed more than once.

11. The method of claim 1, wherein the step of precipitating the mRNA is performed only once.

12. The method of claim 1, wherein the step of capturing the mRNA further comprises subjecting the mRNA to a step of filtration, centrifugation, reversible adsorption to solid phase or a combination thereof.

13. The method of claim 12, wherein the filtration is:
(a) tangential flow filtration (TFF); or
(b) depth filtration (DF).

14. The method of claim 1, wherein the captured mRNA is further subjected to dialysis in a suitable buffer comprising lower salt concentration.

15. The method of claim 1, wherein the solution comprising the IVT-synthesized mRNA comprises DTT, magnesium ions, and an RNA polymerase.

16. The method of claim 1, wherein the reducing agent is present at a final concentration of 5 mM, 10 mM, or 15 mM.

17. The method of claim 1, wherein the reducing agent is selected from dithiothreitol (DTT), beta-mercaptoethanol (b-ME), Tris(2-carboxyethyl)phosphine (TCEP), Tris(3-hydroxypropyl)phosphine (THPP), dithioerythritol (DTE) and dithiobutylamine (DTBA).

18. The method of claim 1, wherein the reducing agent is selected from dithiothreitol (DTT), Tris(2-carboxyethyl)phosphine (TCEP), and Tris(3-hydroxypropyl)phosphine (THPP).

* * * * *